(12) United States Patent
Papouchado et al.

(10) Patent No.: US 11,148,956 B2
(45) Date of Patent: Oct. 19, 2021

(54) SYSTEMS AND METHODS TO TREAT FLUE GAS DESULFURIZATION WASTE TO PRODUCE AMMONIUM SULFATE AND CALCIUM CARBONATE PRODUCTS

(71) Applicant: Elixsys Inc., Bainbridge Island, WA (US)

(72) Inventors: Lucien Papouchado, Aiken, SC (US); Barry E. Scheetz, Lemont, PA (US); Joseph Preston, Bainbridge Island, WA (US)

(73) Assignee: Elixsys, Inc., Bainbridge Island, WA (US)

( * ) Notice: Subject to any disclaimer, the term of this patent is extended or adjusted under 35 U.S.C. 154(b) by 0 days.

(21) Appl. No.: 16/749,860

(22) Filed: Jan. 22, 2020

(65) Prior Publication Data

US 2020/0239325 A1 Jul. 30, 2020

Related U.S. Application Data

(60) Provisional application No. 62/796,541, filed on Jan. 24, 2019, provisional application No. 62/810,066, (Continued)

(51) Int. Cl.
*C01C 1/244* (2006.01)
*C01F 11/18* (2006.01)

(52) U.S. Cl.
CPC .......... *C01C 1/244* (2013.01); *C01F 11/182* (2013.01); *C01P 2004/50* (2013.01)

(58) Field of Classification Search
CPC .... B01D 53/1475; B01D 53/62; B01D 53/75; B01D 53/78; B01D 2251/2062;
(Continued)

(56) References Cited

U.S. PATENT DOCUMENTS 8,758,719 B2 6/2014 Hasinoff
9,193,601 B2 * 11/2015 Ghosh .................. C01C 1/24
(Continued)

FOREIGN PATENT DOCUMENTS

CN 105671304 A 6/2016
CN 105087934 B 5/2018

OTHER PUBLICATIONS

PCT/US2020/015102 International Search Report and Written Opinion, dated Apr. 20, 2020, 9 pages.
(Continued)

*Primary Examiner* — Timothy C Vanoy
(74) *Attorney, Agent, or Firm* — Polsinelli PC

(57) ABSTRACT

Disclosed herein are system and methods for producing a high purity ammonium sulfate product as well as either a lower or a high purity calcium carbonate product by reacting flue gas desulfurization (FGD) gypsum feedstock in batch or continuous mode using synthesized ammonium carbonate from ammonia and carbon dioxide gases. The high purity calcium carbonate is obtained by using a precipitation catalyst, filtering out the impurities, then precipitating a high purity calcium carbonate. Alternatively, the lower purity calcium carbonate may be dissolved in acid, impurities filtered out, then a high purity calcium carbonate is precipitated out using a soluble carbonate salt.

16 Claims, 22 Drawing Sheets

Related U.S. Application Data filed on Feb. 25, 2019, provisional application No. 62/824,523, filed on Mar. 27, 2019, provisional application No. 62/878,542, filed on Jul. 25, 2019.

(58) Field of Classification Search
CPC ...... B01D 2251/2065; B01D 2257/504; B01D 2258/0283; B01J 19/00; B01J 2219/00; B01J 2219/00002; C01F 11/18; C01F 11/182; C01C 1/24; C01C 1/245
See application file for complete search history.

(56) References Cited

U.S. PATENT DOCUMENTS

| | | |
|---|---|---|
| 9,682,868 B2 | 6/2017 | Hasinoff et al. |
| 10,399,862 B2 | 9/2019 | Paynter et al. |
| 2015/0328645 A1 | 11/2015 | Filippov et al. |
| 2015/0344318 A1* | 12/2015 | Lee .......................... C01C 1/24 423/548 |
| 2016/0221834 A1 | 8/2016 | Hasinoff et al. |
| 2018/0265948 A1 | 9/2018 | Laudal et al. |
| 2019/0153562 A1 | 5/2019 | Wang et al. |

OTHER PUBLICATIONS

PCT Translation of CN 105671304 A, Jun. 15, 2016, 10 pages.
PCT Translation of CN 105087934 B, May 15, 2018, 18 pages.
"Manufacture of Ammonium Sulfate Fertilizer for Gypsum-Rich Byproduct of Flue Gas Desulfurization—A Prefeasibility Cost Estimate"; M.-I.M. Chou et al, Illinois State Geological Survey, Dec. 12, 1996, 7 pages.
"Ammonium Sulfate WFGD Technology—Overview for General Industry Information", Marsulex Envirormental Technologies; Jul. 2007, 6 pages.
"Production of Ammonium Sulfate Fertilizer from Waste Gypsum", Dr. Mahmoud Wazne; Nov. 18, 2009, 5 pages.

* cited by examiner

| FGD Gypsum Feedstock Composition | | | |
|---|---|---|---|
| Element | % | Element | g/t |
| Si | 0.25 | Ag | <2 |
| Al | 0.08 | As | <30 |
| Fe | 0.06 | Ba | 7.3 |
| Mg | 0.11 | Be | <0.03 |
| Ca | 23.3 | Bi | <20 |
| K | 0.02 | Cd | <2 |
| Ti | 0.01 | Co | <4 |
| P | <0.01 | Cu | <4 |
| Mn | <0.01 | Li | <70 |
| Cr | <0.01 | Mo | <5 |
| V | <0.01 | Na | 40 |
| LOI | 21.3 | Ni | <20 |
| S | 16.4 | Pb | <20 |
| C(t) | 0.16 | Sb | <30 |
| | | Se | <30 |
| | | Sn | <20 |
| | | Sr | 310 |
| | | Tl | <30 |
| | | U | <20 |
| | | Y | 0.7 |
| | | Zn | <7 |

Fig. 2

| Ammonium Sulfate Crystal Assay (g/t) | |
|---|---|
| Y | <2 |
| U | <4 |
| Si | <4 |
| Al | <0.5 |
| Fe | <5 |
| Mg | <5 |
| Ca | <20 |
| Na | <20 |
| K | <10 |
| Ti | <30 |
| P | <20 |
| Mn | 13.2 |
| Ag | <30 |
| As | <2 |
| Ba | <8 |
| Be | 0.09% |
| Bi | 21.8% |

| | |
|---|---|
| Y | <0.2 |
| U | <20 |
| Si | <700 |
| Al | 6 |
| Fe | 269 |
| Mg | 16 |
| Ca | 489 |
| Na | <10 |
| K | <20 |
| Ti | 3.4 |
| P | <30 |
| Mn | <0.3 |
| Ag | <2 |
| As | <30 |
| Ba | 4.6 |
| Be | <0.03 |
| Bi | <20 |
| Cd | |
| Co | |
| Cr | |
| Cu | |
| Li | |
| Mo | |
| Ni | |
| Pb | |
| Sb | |
| Se | |
| Sn | |
| Sr | |
| Tl | |
| V | |
| Zn | |
| C(t) | |
| S(t) | |

| Impurities > DL | 0.17% |

Fig. 5

Test Conditions

| Test ID | C3 | C5 | C6 | C7 | C9 | C10 | C11 | C12 | C13 | C14 | C15 |
|---|---|---|---|---|---|---|---|---|---|---|---|
| Feed | FGD | FGD | FGD | FGD | FGD | FGD | FGD | FGD | FGD | FGD | FGD |
| Initial % Solids | 25 | 25 | 25 | 100 | 50 | 25 | 25 | 25 | 100 | 25 | 100 |
| Final % Solids | 10 | 11 | 12 | 10 | 16 | 7 | 16 | 12 | 6 | 17 | 11 |
| Reagent | $(NH_4)_2CO_3$ | $(NH_4)_2CO_3$ | $(NH_4)_2CO_3$ | $(NH_4)_2CO_3$ | $(NH_4)_2CO_3$ | $(NH_4)_2CO_3$ | $(NH_4)_2CO_3$ | $(NH_4)_2CO_3$ | $(NH_4)_2CO_3$ | $(NH_4)_2CO_3$ | $(NH_4)_2CO_3$ |
| Reagent Strength (%) | 100 | 100 | 100 | 30 | 100 | 100 | 100 | 100 | 15 | 100 | 15 |
| Reagent Add'n Method | 130% per hour | 100% per hour | 100% per hour | 100% per hour | 100% per hour | 100% per hour | 100% at t=0 | 200% at t=0 | 100% per hour | 150% at t=0 | 200% at t=0 |
| Total Dose (% stoich.) | 390 | 300 | 300 | 300 | 300 | 300 | 100 | 200 | 300 | 150 | 200 |
| Retention Time (h) | 3 | 3 | 3 | 3 | 3 | 3 | 3 | 3 | 3 | 3 | 3 |
| Temperature (°C) | ambient | ambient | ambient | ambient | ambient | ambient | ambient | ambient | ambient | ambient | ambient |
| Seeding/Catalyst | none | none | none | none | none | none | none | none | none | none | none |
| Weight Loss (%) | 42 | 41 | 40 | 44 | 44 | 30 | 36 | 43 | 44 | 43 | 44 |
| Final Solids Colour | tan | lt. brown/grey | lt. brown/grey | lt. brown/grey | grey | v lt grey | grey | grey | grey | tan | tan |

Fig. 6

Calculated Final Product

| Test ID | Solution Grade (NH₄)₂SO₄ (%)[1] | CaCO₃ by Ca | Grade (%) by WRA[2] |
|---|---|---|---|
| C3 | 99.981 | 95 | 99 |
| C5 | 99.995 | 94 | 99 |
| C6 | 99.996 | 94 | 99 |
| C7 | 99.997 | 98 | 99 |
| C9 | 99.991 | 99 | 99 |
| C10 | 99.996 | 97 | 98 |
| C11 | 99.995 | 70 | 99 |
| C12 | 99.985 | 97 | 99 |
| C13 | 99.999 | 97 | 99 |
| C14 | 99.988 | 97 | 99 |
| C15 | 99.996 | 97 | 99 |
| C16 | 99.998 | 98 | 98 |
| C17 | 99.990 | 96 | 98 |
| C18 | 99.997 | 97 | 98 |
| C19 | 99.993 | 91 | 98 |
| C20 | 99.992 | 95 | 98 |
| C21 | 99.992 | 95 | 98 |
| C22 | 99.993 | 96 | 99 |

[1] Sum of elements in ICP scan above DL's, C(t) excluded
[2] Impurity Whole Rock Analysis oxide basis (100% - impurities

Fig. 7

Composition of Ammonium Sulfate Crystal Product

| Test # | Composition—Analytical | | | Composition—XRD | | | | |
|---|---|---|---|---|---|---|---|---|
| | Purity, % | Impurity, g/t | S% by Leco | $(NH_4)_2SO_4$ | $N_2O_3\cdot(SO_3)_4$ | $(NH_4)_3H(SO_4)_2$ | $(NH_4)_{15}(NO_3)_3SO_4$ | N% by XRD | S% by XRD |
| PP2-Ev1 | 99.94 | 642 | 23.1 | 97.5 | 1.0 | 1.4 | - | 21.0 | 24.3 |
| PP2-Ev2 | 99.84 | 1557 | 23.5 | 98.8 | 1.2 | - | - | 21.0 | 24.3 |
| PP2-Ev3 | 99.90 | 986 | 23.3 | 96.8 | 1.0 | 0.7 | 1.5 | 21.2 | 24.1 |
| PP2-Ev4 | 99.95 | 534 | 23.1 | 98.0 | 0.9 | 0.5 | 0.6 | 21.1 | 24.2 |
| TEC-1 | 99.91 | 879 | 21.9 | 100.0 | - | - | - | 21.2 | 24.3 |
| TEC-2 | 99.98 | 233 | 22.5 | 100.0 | - | - | - | 21.2 | 24.3 |

Fig. 12

Ashes used in the study
*bulk chemical compositions %*

| Northern Appalachian Coal F class Coal | | Powder River Basin Coal C class Coal | |
|---|---|---|---|
| major oxides | % | major oxides | % |
| • SiO2 | 35.1 | • SiO2 | 26.2 |
| • Al2O3 | 18.1 | • Al2O3 | 16.4 |
| • Fe2O3 | 16.0 | • Fe2O3 | 8.15 |
| • MgO | 1.1 | • MgO | 6.28 |
| • CaO | 13.3 | • CaO | 25.7 |
| • Na2O | 1.11 | • Na2O | 2.73 |
| • K2O | 1.3 | • K2O | 0.67 |

Fig. 19

CHEMICAL COMPOSITION OF ASHES USED IN THIS STUDY

| Analyte | F Class Ash | C Class Ash |
|---|---|---|
| SiO2 % | 35.1 | 26.2 |
| Al2O3 % | 18.1 | 16.4 |
| Fe2O3 % | 1.6 | 8.15 |
| MgO % | 1.1 | 6.28 |
| CaO % | 13.9 | 25.7 |
| Na2O % | 1.11 | 2.23 |
| K2O % | 1.31 | 0.67 |
| TiO2 % | 0.91 | 1.37 |
| P2O5 % | 0.33 | 1.9 |
| MnO % | 0.03 | 0.02 |
| Cr2O3 % | 0.01 | 0.01 |
| V2O5 % | 0.03 | 0.08 |
| LOI % | 19 | 3.55 |
| Sum % | 97.3 | 92.9 |
| C(t) % | 4.74 | 2.49 |
| S % | 1.59 | 2.09 |

| Analyte | F Class Ash | C Class Ash |
|---|---|---|
| La g/t | 47 | 63 |
| Ce g/t | 98 | 124 |
| Pr g/t | 11.9 | 13.5 |
| Nd g/t | 45 | 56 |
| Sm g/t | 10.2 | 11.6 |
| Eu g/t | 1.9 | 2.9 |
| Gd g/t | 9 | 10 |
| Tb g/t | 1.6 | 1.5 |
| Dy g/t | 7.5 | 9.1 |
| Ho g/t | 1.6 | 1.8 |
| Y g/t | 46.6 | 46 |
| Er g/t | 4.2 | 5.3 |
| Tm g/t | 0.7 | 0.9 |
| Yb g/t | 5.7 | 4.7 |
| Lu g/t | 1 | 0.7 |
| Sc g/t | <25 | <25 |
| Th g/t | 17.8 | 22.6 |
| U g/t | 5.6 | 0.8 |

| Analyte | F Class Ash | C Class Ash |
|---|---|---|
| Ag g/t | <2 | <2 |
| As g/t | <100 | <30 |
| Ba g/t | 1370 | 2800 |
| Be g/t | 6.97 | 4.25 |
| Bi g/t | <20 | <20 |
| Cd g/t | <2 | <4 |
| Co g/t | 26 | 49 |
| Cu g/t | 68.2 | - |
| Mo g/t | 28 | 8 |
| Ni g/t | 61 | 109 |
| Pb g/t | <10 | 102 |
| Sb g/t | <10 | <10 |
| Se g/t | <30 | <30 |
| Sn g/t | <20 | <30 |
| Sr g/t | 1750 | 5360 |
| Tl g/t | <30 | <30 |
| Zn g/t | 109 | 275 |

Fig. 20

MINEROLOGICAL COMPOSITION OF THE ASHES STUDIED
Semi-quantitative XRD

| Formula | Mineral | F Class Ash (wt.%) | C Class Ash (wt.%) |
|---|---|---|---|
| $SiO_2$ | Quartz | 12.6 | 7.3 |
| $SiO_2$ | Tridymite | 5.7 | - |
| $Al_6Si_2O_{13}$ | Mullite | 18.5 | 11.4 |
| $NaAlSi_3O_8$ | Albite | 10.0 | 13.3 |
| $KAlSi_3O_8$ | Microcline | 8.1 | 2.9 |
| $Al_2Si_2O_5(OH)_4$ | Kaolinite | - | 7.4 |
| $Fe_2O_3$ | Hematite | 6.2 | 2.5 |
| $FeCl_2$ | Iron Chloride | - | - |
| $\gamma\text{-}Fe_2O_3$ | Maghemite | 8.0 | 8.2 |
| $FeCO_3$ | Siderite | 3.4 | - |
| $FeTiO_3$ | Ilmenite | - | 2.1 |
| $CaSO_4$ | Anhydrite | 6.8 | 15.2 |
| $CaCO_3$ | Calcite | 3.2 | 3.5 |
| $Ca_5(PO_4)_3OH$ | Hydroxylapatite | - | 13.2 |
| $CaO$ | Calcium oxide | 10.5 | - |
| $Ca(OH)_2$ | Portlandite | - | 1.7 |
| $CaO$ | Lime | - | - |
| $CaMg(CO_3)_2$ | Dolomite | 3.1 | 5.7 |
| $MgO$ | Periclase | - | 1.6 |
| $Ba(Sr)PO_4$ | Barite, Strontian | 3.0 | 2.4 |
| $C$ | Graphite | 0.9 | - |
| $TiO_2$ | Anatase | - | 1.7 |
| $NaCl$ | Halite | - | - |
| | TOTAL | 100 | 100 |

Fig. 21

| pH 3 | | pH 4 | | pH 5-8 | | pH 9 | | pH 10 | | pH 11 | | pH 12 | |
|---|---|---|---|---|---|---|---|---|---|---|---|---|---|
| | % | | % | | % | | % | | % | | % | | % |
| Fe | 87.500 | Al | 88.53 | Al | 56.36 | Mn | 71.8 | Mg | 75.4 | Mg | 100 | Ca | 100 |
| Al | 6.700 | Fe | 4.01 | Mg | 11.05 | Ni | 14.1 | Ca | 24.6 | | | | |
| P | 4.800 | Na | 3.57 | Ce | 7.22 | La | 8.7 | | | | | | |
| Ti | 0.379 | Mg | 1.83 | Zn | 6.08 | Zn | 5.4 | | | | | | |
| V | 0.372 | Ca | 1.27 | Nd | 3.59 | | | | | | | | |
| Cr | 0.120 | P | 0.4 | Pb | 3.32 | | | | | | | | |
| Mo | 0.065 | Zn | 0.2 | Y | 3.07 | | | | | | | | |
| Sc | 0.023 | K | 0.07 | Mn | 2.98 | | | | | | | | |
| Tb | 0.007 | Ni | 0.06 | La | 1.85 | | | | | | | | |
| U | 0.007 | Ti | 0.03 | Pr | 0.87 | | | | | | | | |
| | | V | 0.02 | Ni | 0.77 | | | | | | | | |
| | | Sr | 0.02 | Sm | 0.64 | | | | | | | | |
| | | Y | 0.02 | Gd | 0.60 | | | | | | | | |
| | | Li | 0.02 | Dy | 0.46 | | | | | | | | |
| | | U | 0.01 | Cu | 0.33 | | | | | | | | |
| | | Ce | 0.01 | Er | 0.22 | | | | | | | | |
| | | Nd | 0.01 | Yb | 0.18 | | | | | | | | |
| | | Mn | 0.01 | Eu | 0.14 | | | | | | | | |
| | | Co | 0.01 | Fe | 0.11 | | | | | | | | |
| | | Cr | 0.01 | Ho | 0.09 | | | | | | | | |
| | | Mo | 0.01 | Tb | 0.06 | | | | | | | | |
| | | | | Ag | 0.01 | | | | | | | | |

Fig. 22

SYSTEMS AND METHODS TO TREAT FLUE GAS DESULFURIZATION WASTE TO PRODUCE AMMONIUM SULFATE AND CALCIUM CARBONATE PRODUCTS

RELATED APPLICATIONS

The present application claims priority to U.S. Patent App. No. 62/796,541, entitled Systems and Methods to Treat Flue Gas Desulfurization (FGD) Waste to Produce High Purity Ammonium Sulfate and Calcium Carbonate Products, filed Jan. 24, 2019, U.S. Patent App. No. 62/810,066, entitled Removal of Chloride from Flue Gas Desulfurization Feed, filed Feb. 25, 2019, U.S. Patent App. No. 62/824,523, entitled Reducing the Cost of Reagents for Treating Metal Bearing Wastes, filed Mar. 26, 2019, and U.S. Patent App. No. 62/878,542, entitled Systems and Methods for Pretreatment of Feedstocks Comprising Sulfites, filed Jul. 24, 2019, which are herein incorporated by reference in their entirety.

COPYRIGHT NOTICE

Contained herein is material that is subject to copyright protection. The copyright owner has no objection to the facsimile reproduction by anyone of the patent document or the patent disclosure, as it appears in the United States Patent and Trademark Office patent file or records, but otherwise reserves all rights to the copyright whatsoever. The following notice applies to the software, screenshots and data as described below and in the drawings hereto and All Rights Reserved.

TECHNICAL FIELD

This disclosure relates generally to chemical processing of Coal Combustion Products (CCP) to produce value-added, marketable products.

BACKGROUND

Coal combustion products (CCP) comprise fly ash (fine particulates collected in electrostatic precipitators), a lime or limestone absorption spray tower to separate out sulfur oxide ($SO_x$) gases, and bottom ash remaining behind after coal combustion. The lime or limestone in the absorption bed reacts with the $SO_x$ gases resulting in calcium sulfite (hannabeckite, $CaSO_3 \cdot 0.5H_2O$). The calcium sulfite is often oxidized to calcium sulfate, which is referred to as flue gas desulfurization (FGD) gypsum. In some coal plants, the calcium sulfite/sulfate byproduct is separate from the other byproducts while in others it is mixed in with the ash.

Currently, the primary applications of the calcium sulfate ($CaSO_4$) or FGD gypsum are in the wallboard industry and as a soil amendment. The fly ash commonly goes into the construction industry as a cement additive. However, significant portions of the FGD gypsum and ashes are not marketable, are stored in piles and ponds, and present a plethora of environmental issues.

While many proposals have been made to treat FGD byproducts, none have presented a fully integrated and demonstrated process scalable to a profitable industrial scale that could handle FGD gypsum or FGD gypsum mixed with ash.

Disclosed herein are systems and methods for processing FGD gypsum into marketable value-added products with near zero waste. The products are ammonium sulfate and calcium carbonate. The ammonium sulfate product is a highly desirable fertilizer product and the calcium carbonate is used as an additive in several industries such as plastics, elastomers, paper, and others, in some embodiments. The values of these products are higher than those in wallboard and concrete industries.

SUMMARY

Systems and methods are disclosed for continuous processing of calcium sulfate feedstock to form ammonium sulfate and calcium carbonate products. In one aspect, the systems and methods comprise: combining ammonia gas, carbon dioxide, and flowing water with a mixer to generate an ammonium carbonate reagent solution; reacting calcium sulfate feedstock with the ammonium carbonate reagent solution to form a reacted slurry in one or more reactors; separating calcium carbonate from the reacted slurry using a filter and resulting in a residue, which is calcium carbonate, and a filtrate which is an ammonium sulfate liquor; drying the residue in a dryer to produce calcium carbonate product; using an evaporator to evaporate water from the ammonium sulfate liquor, then using a crystallizer to form ammonium sulfate crystals from the ammonium sulfate liquor resulting in ammonium sulfate crystals and processed liquor; and using a centrifuge to separate the ammonium sulfate crystals from the processed liquor, wherein the processed liquor is recycled to the evaporator and evaporator condensate containing excess ammonium carbonate is recycled back to the first reactor.

Applicant(s) herein expressly incorporate(s) by reference all of the following materials identified in each paragraph below. The incorporated materials are not necessarily "prior art".

U.S. patent application Ser. No. 15/669,870, entitled System and Method for Distributed Trading Platform, filed Aug. 4, 2017, herein incorporated by reference in its entirety.

U.S. patent application Ser. No. 15/675,697, entitled Systems and Methods for Using Smart Contracts to Control the Trade, Supply, Manufacture, and Distribution of Commodities, filed Aug. 11, 2017, herein incorporated by reference in its entirety.

If it is believed that any of the above-incorporated material constitutes "essential material" within the meaning of 37 CFR 1.57(d)(1)-(3), applicant(s) reserve the right to amend the specification to expressly recite the essential material that is incorporated by reference as allowed by the applicable rules.

Aspects and applications presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain, and ordinary meaning to the terms be applied to the interpretation of the specification and claims.

Further, the inventors are informed of the standards and application of the special provisions of 35 U.S.C. § 112(f). Thus, the use of the words "function," "means", or "step" in the Detailed Description or Description of the Drawings or claims is not intended to somehow indicate a desire to invoke the special provisions of 35 U.S.C. § 112(f) to define the systems, methods, processes, and/or apparatuses disclosed herein. To the contrary, if the provisions of 35 U.S.C. § 112(f) are sought to be invoked to define the embodiments, the claims will specifically and expressly state the exact phrases "means for" or "step for" and will also recite the word "function" (i.e., will state "means for performing the function of . . . "), without also reciting in such phrases any structure, material, or act in support of the function. Thus, even when the claims recite a "means for performing the function of . . . " or "step for performing the function of . . . ", if the claims also recite any structure, material, or acts in support of that means or step, then it is the clear intention of the inventors not to invoke the provisions of 35 U.S.C. § 112(f). Moreover, even if the provisions of 35 U.S.C. § 112(f) are invoked to define the claimed embodiments, it is intended that the embodiments not be limited only to the specific structures, materials, or acts that are described in the preferred embodiments, but in addition, include any and all structures, materials, or acts that perform the claimed function as described in alternative embodiments or forms, or that are well known present or later-developed equivalent structures, materials, or acts for performing the claimed function.

BRIEF DESCRIPTION OF THE DRAWINGS

A more complete understanding of the systems, methods, processes, and/or apparatuses disclosed herein may be derived by referring to the detailed description when considered in connection with the following illustrative figures. In the figures, like-reference numbers refer to like-elements or acts throughout the figures.

FIG. 2 is a table showing the composition of an FGD gypsum feedstock used in preliminary testing.

FIG. 5 depicts crystallized ammonium sulfate product assays for ammonium sulfate product generated in preliminary testing of the FGD conversion process.

FIG. 6 depicts example test conditions and results from preliminary testing of the FGD conversion process.

FIG. 7 depicts calculated final product generated in preliminary testing of the FGD conversion process.

FIG. 12 depicts a composition of an ammonium sulfate product produced by the pilot production plant depicted in FIG. 8.

FIG. 19 is a table depicting the major, minor, and trace elemental composition of the class F and class C ash feedstocks used in preliminary testing of the ash conversion process.

FIG. 20 is a table depicting the major, minor, and trace elemental composition of the class F and class C feedstocks used in preliminary testing of the ash conversion process.

FIG. 21 is a table depicting mineralogical composition of the class F and class C ash feedstocks used in preliminary testing of the ash conversion process.

FIG. 22 is a table depicting the major earth forming oxides of a class F and a class C ash feedstock used in preliminary testing of the ash conversion process.

Elements and acts in the figures are illustrated for simplicity and have not necessarily been rendered according to any particular sequence or embodiment.

DETAILED DESCRIPTION

Although the disclosure described herein is susceptible to various modifications and alternative iterations, specific embodiments thereof have been described in greater detail herein. It should be understood, however, that the detailed description of the systems and methods is not intended to limit the disclosure to the specific embodiments disclosed. Rather, it should be understood that the disclosure is intended to cover modifications, equivalents, and alternatives falling within the spirit and scope of the disclosure. In the following description, and for the purposes of explanation, numerous specific details, process durations, and/or specific formula values are set forth in order to provide a thorough understanding of the various aspects of exemplary embodiments. However, it will be understood by those skilled in the relevant arts that the apparatus, systems, and methods herein may be practiced without all of these specific details, process durations, and/or specific formula values. It should be noted that there are different and alternative configurations, devices, and technologies to which the disclosed embodiments may be applied. The full scope of the embodiments is not limited to the examples that are described below.

In the following examples of the illustrated embodiments, references are made to the accompanying drawings which form a part hereof, and in which is shown by way of illustration various embodiments in which the systems, methods, processes, and/or apparatuses disclosed herein may be practiced. It is to be understood that other embodiments may be utilized and structural and functional changes may be made without departing from the scope.

Headings are for organizational purposes only and are not intended to be limiting. Embodiments described under the various headings herein are interoperable with embodiments under other headings.

Overview

Disclosed herein are systems and methods for reacting flue gas desulfurization (FGD) gypsum (calcium sulfate) feedstock, in either batch or continuous mode, with ammonium carbonate reagent to produce commercial products wherein the commercial products comprise ammonium sulfate and calcium carbonate. The systems and methods described herein are highly beneficial to the coal industry in that they produce higher value products from coal waste. The primary reaction is shown in equation 1 below.

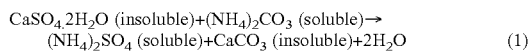

$$CaSO_4 \cdot 2H_2O \text{ (insoluble)} + (NH_4)_2CO_3 \text{ (soluble)} \rightarrow (NH_4)_2SO_4 \text{ (soluble)} + CaCO_3 \text{ (insoluble)} + 2H_2O \quad (1)$$

Figure 1:
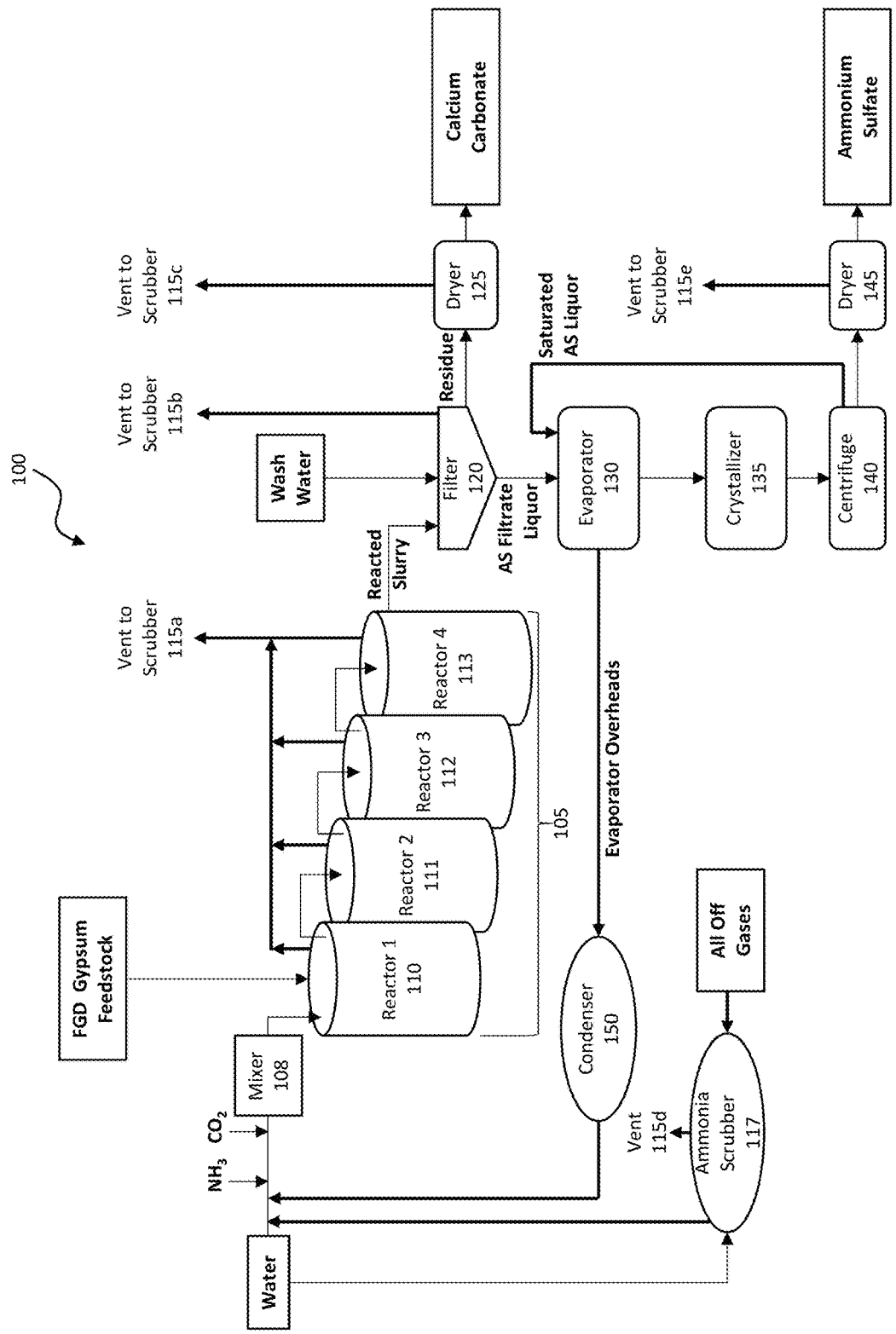
FIG. 1 depicts an embodiment of a production plant for implementing an FGD gypsum conversion process.

FIG. 1 depicts an embodiment of a production plant 100 for implementing an FGD gypsum conversion process resulting in at least two commercial products. In the depicted embodiment, FGD gypsum (calcium sulfate) feedstock is fed, either in batch or continuous mode, into a reactor cascade 105 (comprising reactors 110, 111, 112, and 113) with ammonium carbonate reagent, which may be synthesized from ammonia and carbon dioxide gases or supplied as a powder. In some embodiments, the FGD gypsum feedstock may be fed to the system using a quantitative powder feeder or a gravimetric feeder optionally coupled to a screw feeder (not shown). In some embodiments, the FGD gypsum feedstock is in powder form. In embodiments where the FGD gypsum feedstock is moist it may require drying prior to feeding to avoid blockages in the feeder. In some embodiments, the FGD gypsum feedstock may be dried to 7% by weight or less moisture content.

The number of reactors in the reactor cascade 105 may vary depending on throughput required, the size and type of reactors, and the reaction time needed. In some embodiments, there may be between three and five reactors. As an example, for a two-hour reaction with four reactors having total volume V, the scaled total volume needed would be 4/3 V for three reactors and 2V for two reactors. The same rule applies when increasing the number of reactors. In some embodiments, the size of the reactors 110, 111, 112, and 113 may be reduced using weirs.

The one or more reactors 110, 111, 112, and 113 may be connected in overflow mode (material overflows from the top of a reactor to the next reactor) or underflow mode (material flows from the bottom of a reactor to the next reactor), or material may be transferred using one or more pumps between the one or more reactors. In some embodiments, the one or more reactors 110, 111, 112, and 113 may be continuously stirred tank reactors (CSTRs), stirred tank reactors, and/or in-line (located in a transfer line) reactors. In some embodiments, the first reactor 110 may be a small, high intensity reactor to thoroughly mix the FGD gypsum feedstock and reagent, followed by two to three (larger, in some embodiments) reactors 111, 112, and/or 113 to hold the mixture long enough for the reaction to reach completion (i.e. 99+% conversion of FGD gypsum feedstock) resulting in a reacted slurry. In the depicted embodiment, the reactor cascade 105 vents ammonia gas from the ammonium carbonate reagent through vent 115a to the scrubber 117. Either water or between 0.01 to 0.1M sulfuric acid may be used in the scrubber 117. The ammonia from the vents 115a-e dissolves in water to yield ammonium hydroxide or, in the case of sulfuric acid, the ammonia reacts to form ammonium sulfate. The ammonium hydroxide or ammonium sulfate from the scrubber 117 may optionally be recycled back into the reagent feed line into reactor 110, in some embodiments.

After the reaction has reached completion, the reacted slurry is pumped, underflows, or overflows from the reactor cascade 105 into a filter 120 resulting in calcium carbonate residue and ammonium sulfate filtrate liquor. Wash water is pumped through filter 120 in the depicted embodiment. Ammonia off-gases from the filter 120 vent through vent 115c to scrubber 117. In some embodiments, filter 120 may be a drum filter or other similar continuous filter. The calcium carbonate residue from filter 120 proceeds to dryer 125 to produce calcium carbonate product. In the depicted embodiment, dryer 125 vents through vent 115c ammonia to scrubber 117. In some embodiments, the calcium carbonate product may be further processed. Further processing options are discussed in the Examples.

In the depicted embodiment, ammonium sulfate (AS) filtrate liquor proceeds from filter 120 to evaporator 130 where water is evaporated from the ammonium sulfate liquor, and then to crystallizer 135 where ammonium sulfate crystals are produced in ammonium sulfate liquor (also referred to as processed liquor). Centrifuge 140 separates the ammonium sulfate crystals from the ammonium sulfate liquor (processed liquor) resulting in separated ammonium sulfate crystals and saturated ammonium sulfate liquor. Dryer 145 dries the separated ammonium sulfate crystals resulting in ammonium sulfate product. The dryer 145 vents through vent 115e to scrubber 117. In some embodiments, saturated ammonium sulfate liquor is pumped from the centrifuge 140 back into the evaporator 130. Overheads or vapors coming off the top of the evaporator 130, containing excess ammonium carbonate reagent, may optionally proceed through a condenser 150 (evaporator condensate) to be recycled back into the reactor cascade 105 to react with the FGD gypsum feedstock thus reducing reagent demand and reducing waste streams. In the depicted embodiment, water is pumped into the reactor cascade 105 and into the ammonia scrubber 117. In the depicted embodiment, all off-gases, including water vapor and ammonia in some embodiments, vent through vents 115a, 115b, 115c, 115d, 115e to ammonia scrubber 117.

In some embodiments, the ammonium sulfate may be vacuum evaporated, the salt allowed to crystallize out, and the solid product is then filtered using a solid/liquid separation device. The conditions in the crystallizer 135 may be controlled to produce larger crystals which are more desirable in some markets. The ammonium sulfate product may be greater than or equal to 99% pure. The ammonium sulfate crystallization and the centrifuge separation processes may be continuous.

Filter 120 and centrifuge 135 are both solid/liquid separators and may be substituted by other solid/liquid separators in other embodiments. For example, a belt filter may be used in place of filter 120 and a rotating drum filter may be used in place of the centrifuge 135. In some embodiments, a spray dryer may be used in place of the evaporator 130 and crystallizer 135. The spray dryer evaporates the water and forms small crystals all in one step. Continuous filtration systems other than those depicted in FIG. 1 may be utilized in the process. The equipment used in the process may be sized to fit the desired input/output. Material transfer between processes/equipment may be carried out with the use of pumps, etc.

Reagents

In the embodiment depicted in FIG. 1, ammonium carbonate reagent is synthesized using ammonia ($NH_3$) and carbon dioxide ($CO_2$) gases in flowing water. In some embodiments, the $NH_3$ and $CO_2$ gas are injected in the stoichiometric ratio of 2:1 respectively. The gases may be introduced sequentially using gas nozzles into a flowing water stream in either a batch process or a continuous process. The gases are best fed sequentially with the $NH_3$ first followed by the $CO_2$ because $NH_3$ is more soluble in water than $CO_2$ and $CO_2$ is more soluble in ammonium hydroxide than in plain water. This order of gas introduction into the water has been found to reduce the chances of an ammonia gas release. In alternative embodiments, the order of gas introduction into the water may be reversed. Sequential feed of the $NH_3$ and $CO_2$ gases reduces chance of clogging in the gas nozzle; however, the $NH_3$ and $CO_2$ gases may be premixed, in some embodiments. The $NH_3$ and $CO_2$ gases may be mixed with process water using a mixer 108 such as an in-line mixer or a reactor tank with mixer resulting in an ammonium carbonate reagent solution. In some embodiments, the gases may be fed directly into mixer 108.

The pH may optionally be monitored to ensure carbonate is formed (between pH 8.7-9.0), not bicarbonate. Conductivity and/or the specific gravity may be monitored using an electric conductivity meter and a hydrometer, respectively, to determine the concentration of ammonium carbonate reagent formed. Both conductivity and specific gravity increase as the concentration of the ammonium carbonate formed in solution increases. For example, for a 15% concentration of ammonium carbonate in solution, the conductivity is 80-90 mS/cm (milli-siemens/centimeter).

The resulting ammonium carbonate reagent may be fed directly into reactor cascade 105. In some embodiments, the ammonium carbonate reagent is added in excess (more than stoichiometric) to ensure the reaction goes to completion (i.e. that all the FGD gypsum feedstock is reacted). In some embodiments, 140% stoichiometric addition of the ammonium carbonate reagent results in the reaction going to completion. If the reaction is not complete, then the calcium carbonate product is contaminated with FGD gypsum feedstock.

Products

In some embodiments, to make the products more commercially attractive, the ammonium sulfate and/or the calcium carbonate products may be agglomerated in an agglomerator to larger, more flowable particles to facilitate product application. In some embodiments, the particles are several millimeters in size. In some embodiments the ammonium sulfate and/or calcium carbonate products may be further treated with coating agents, such as stearic acid and stearates, to improve their properties for specific markets, such as to reduce their moisture absorption. In some embodiments, the ammonium sulfate and/or calcium carbonate products may be treated with an additive to reduce the absorption of water.

Ammonium Sulfate

The ammonium sulfate product produced by production plant 100 (FIG. 1) may be used as a solution. In some embodiments, the ammonium sulfate product is greater than 99% pure. In some embodiments, the ammonium sulfate solid product is fertilizer grade. Ammonium sulfate is primarily used in the global fertilizer industry as a soil amendment to replenish depleted levels of nitrogen and sulfur to the soil. An additional use in the fertilizer industry is as an adjuvant for various insecticides, herbicides, and fungicides. Ammonium sulfate may also be used in non-agricultural products and processes such as for flameproofing of select materials, textile dyeing, a cattle feed supplement, and for certain water treatment processes.

Calcium Carbonate

The calcium carbonate product produced by production plant 100 (FIG. 1) is insoluble. In some embodiments, the calcium carbonate product may contain small amounts of impurities, such as carbon and iron, which may cause it to have a grey or tan color. In some embodiments, the calcium carbonate is 90-99% pure. In some embodiments, the calcium carbonate product may be further processed to obtain a higher purity white calcium carbonate product which typically has higher market value. Some exemplary calcium carbonate whitening processes are described in the examples under the heading Calcium Carbonate Processing.

Calcium carbonate has a plethora of uses in many diverse industries including: the oil and gas industry as drilling fluid make-up to increase the fluid density, as an additive to control fluid loss to formation, and in oilfield cementing as a loss circulation material; the building materials and construction industry for roofing shingles, tiles, and cement, brick, and concrete block manufacture; and commercial applications such as industrial filler in the paper, paint, plastics, and rubber industries.

Environmental Benefits

The processes described herein are environmentally sound with internal recycles and near zero waste. All parts of the processes where ammonia gas may be released may be exhausted to one or more water (or dilute sulfuric acid) scrubbers where the ammonia is recaptured and recycled to one or more of systems/processes. Coupling to an adjacent Haber process (a process for producing ammonia from nitrogen and hydrogen), in some embodiments, could minimize the amount of ammonia that would need to be stored on site thus reducing the hazards associated with storing large quantities of ammonia. Locating a production plant 100 (FIG. 1) near a source of carbon dioxide, such as a coal power plant in some embodiments, could allow around 10% by volume of the carbon dioxide emissions from the coal power plant to be utilized in the production plant 100 (FIG. 1) using a side stream taken from the exhaust stack. $CO_2$ gas may be provided from other processes, plants, or sources including naturally occurring or stored $CO_2$ gas which may be pumped from underground formations. Carbon capture is another potential environmental benefit of the processes described herein as $CO_2$ gas is converted to a solid carbonate compound. In some embodiments, one or more internal recycles may be incorporated to recover reagents resulting in near-zero waste stream which is of significant environmental benefit.

Examples

Preliminary Testing

The systems and methods disclosed herein were first developed by testing batch reactions under different conditions to arrive at initial operating conditions for a continuous demonstration. The following data was generated in preliminary testing with a particular feedstock and should not be considered limiting. Other operating conditions are anticipated.

Figure 3:
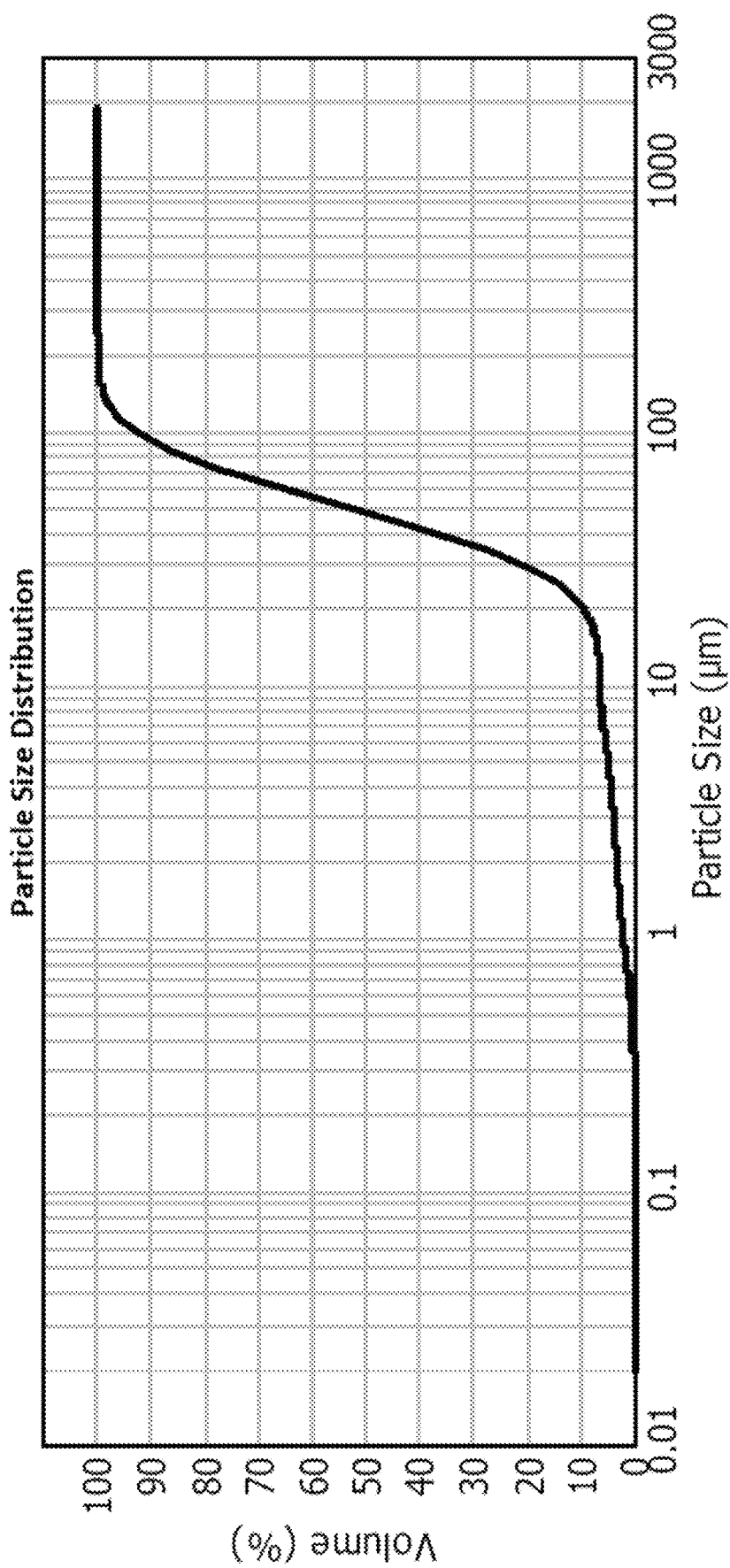
FIG. 3 depicts a particle size distribution analysis for the FGD gypsum feedstock used in preliminary testing.

FGD gypsum feedstock from a typical coal power plant was used as the feedstock in preliminary testing. The composition of the FGD gypsum feedstock used in preliminary testing of the FGD conversion process is depicted in FIG. 2 and the particle size analysis of the FGD gypsum feedstock is shown in FIG. 3. Values shown "<X" are below detection limits, where X is the detection limit of the equipment used in the analysis.

Batch Process

Figure 4:
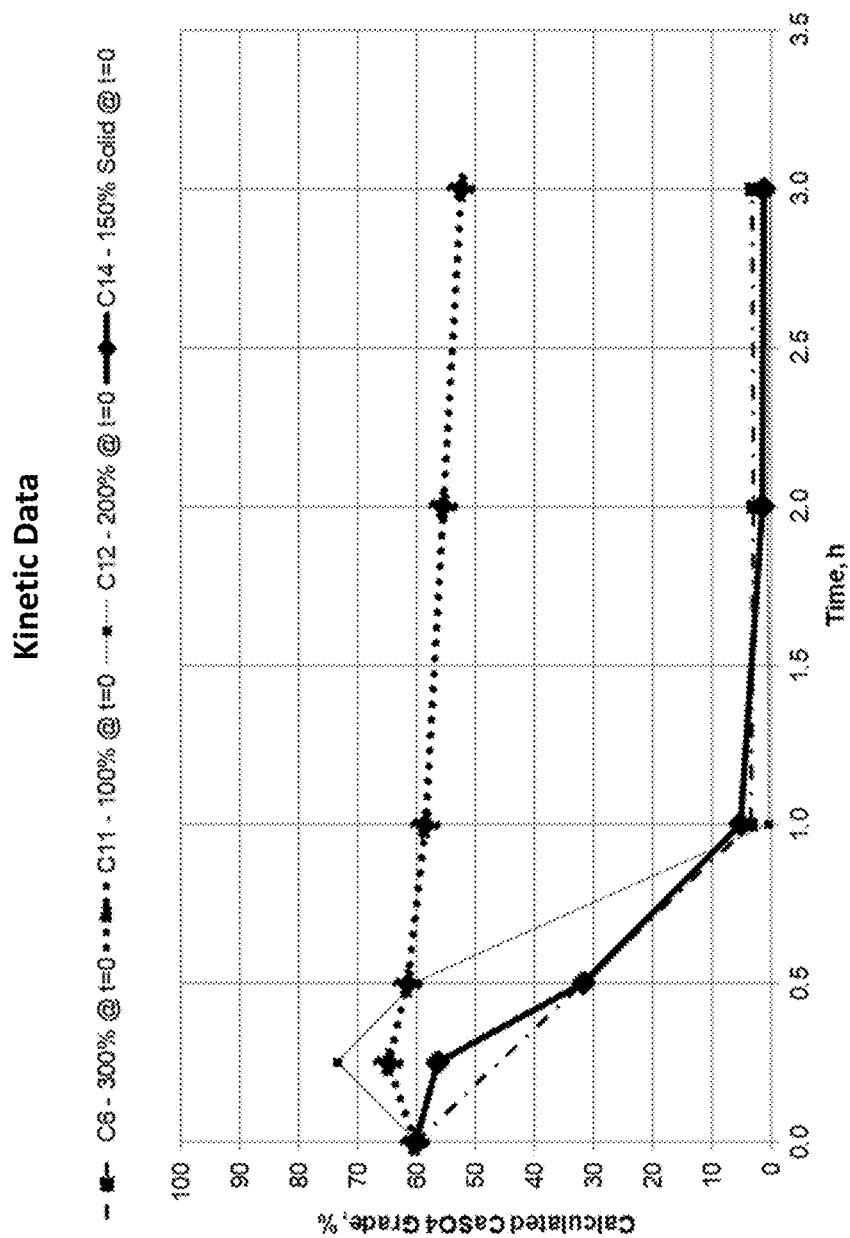
FIG. 4 depicts kinetic data for varying reagent additions in preliminary testing of the FGD gypsum conversion process.

In preliminary batch testing, FGD gypsum feedstock samples were slurried in water at 19% by weight solids and reacted with 15% concentration ammonium carbonate reagent solution at ambient temperature and pressure. Higher solids samples can also be used with equivalent increases in the ammonium carbonate reagent. Higher temperatures are not desirable because the ammonium carbonate reagent is less stable at higher temperatures. Kinetic data for varying reagent additions used in preliminary testing of the FGD conversion process, depicted in the chart in FIG. 4, shows that at 140%-150% stoichiometric additions of reagents to reactants the reaction between FGD gypsum feedstock and ammonium carbonate worked well and after one to three hours, at atmospheric pressure and ambient temperature, produced ammonium sulfate >99.9% in the liquor and 93-95% calcium carbonate product. When evaporated to dryness, the purity of the ammonium sulfate was >99.7%. Assays for the crystallized ammonium sulfate product produced in preliminary testing of the FGD conversion process are depicted in FIG. 5. The assay results were 99.7% or 99.9% depending on the assay method. Values shown "<X" are below detection limits, where X is the detection limit.

Test conditions and results of preliminary testing of the FGD conversion process are depicted in FIG. 6. Calculated final product generated in preliminary testing of the FGD conversion process is depicted in FIG. 7. Based on these tests, the optimum stoichiometry for the FGD conversion process was 140% to 150% and the FGD conversion reaction was complete after one to three hours. From 140% to 100% stoichiometry the reaction slows down as excess reagent is decreased. Stoichiometry lower than 100% resulted in less than 99% conversion of FGD gypsum feedstock, while higher than 150% stoichiometric resulted in wasted reagent. Variations in the composition of the feedstock may produce different results.

Continuous Process

As discussed herein, the FGD conversion process may be operated in a continuous mode.

Figure 8:
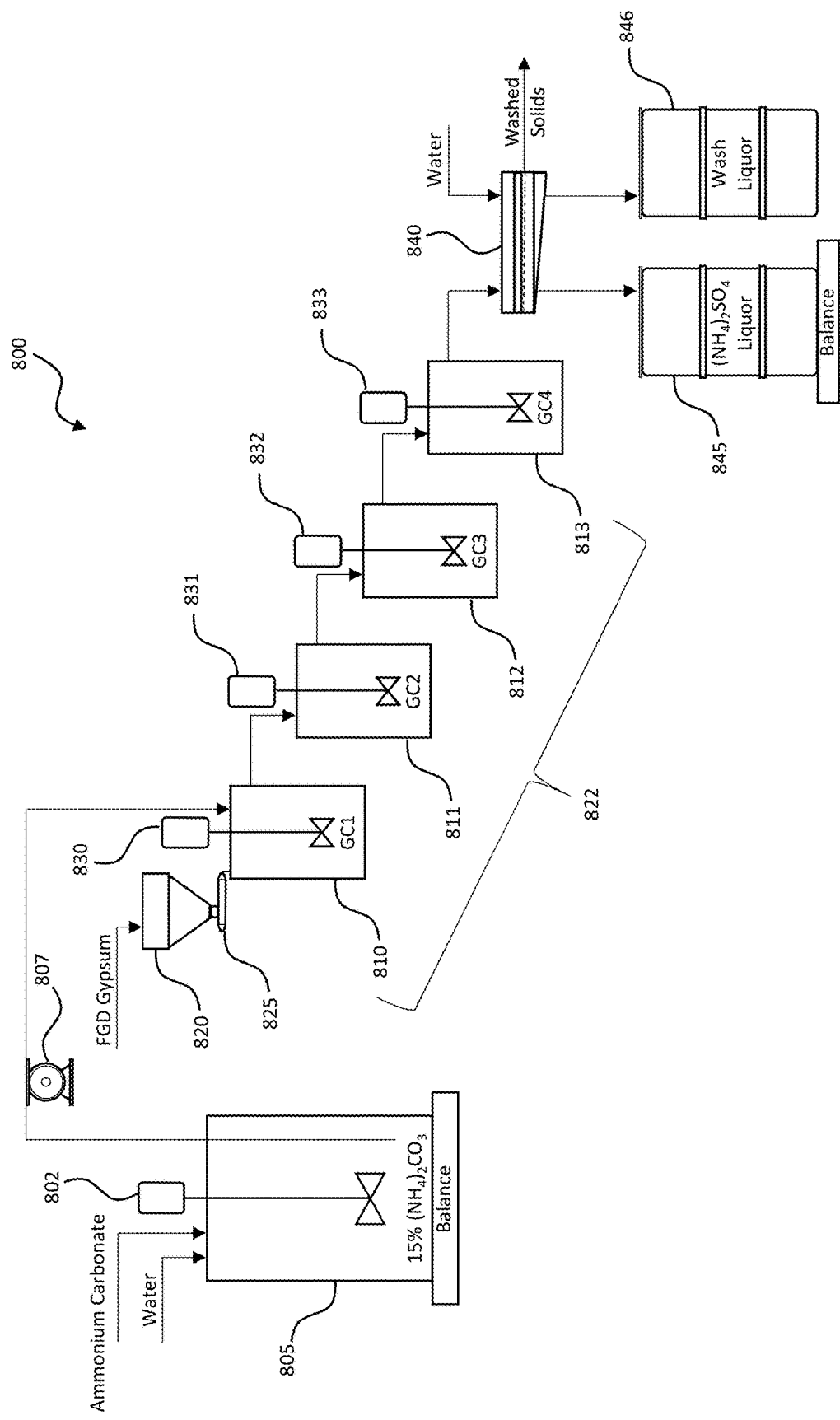
FIG. 8 depicts a schematic of a pilot production plant operating in continuous mode.

Continuous mode was demonstrated in a pilot production plant 800, depicted in FIG. 8, operated at an FGD gypsum feedstock feed rate of 1 kg/hr. Ammonium carbonate reagent was mixed by mixer 802 with water in vessel 805 to produce a 15% concentration ammonium carbonate solution that was pumped by pump 807 into the first reactor 810, operating in an overflow mode to three other reactors 811, 812, and 813, to provide sufficient reaction time for the conversion to go to completion. In some embodiments, material may be transferred between the reactors 810, 811, 812, and 813 using underflow, overflow, or a pump. The FGD gypsum feedstock was fed as a powder from bin 820 using a screw feeder 825 to the first reactor in the reactor cascade 822, comprising reactors 810, 811, 812, and 813, where it was mixed with the ammonium carbonate solution. The slurry is then kept in suspension by mixers 831, 832, and 833 in each reactor 811, 812, and 813 to allow sufficient time for the reaction to take place. The slurry overflowed from reactor 813 into a continuous filter 840 (alternating between two pan filters) to remove the solid calcium carbonate product (which was then washed) and the resulting filtrate, ammonium sulfate liquor, was collected in tank 845. The wash liquid was collected in tank 846.

The pilot production plant 800 depicted in FIG. 8 was operated at a constant 20° C.±3° C. and a pH ranging between 7.5 and 8.5 for 110 hours (over the course of five days) at the following conditions:

Condition 1A: 150% of the stoichiometric quantity of reactants, Day 1-2
Condition 2: 125% of the stoichiometric quantity of reactants, Day 2
Condition 1A: 150% of the stoichiometric quantity of reactants, Day 3
Condition 1B: 150% of the stoichiometric quantity of reactants+catalyst, Day 3
Condition 3: 140% of the stoichiometric quantity of reactants, Day 4
Condition 4: 150%, of the stoichiometric quantity of reactants and at double the feed rates (2 kg/hr), Day 4

Figure 9:
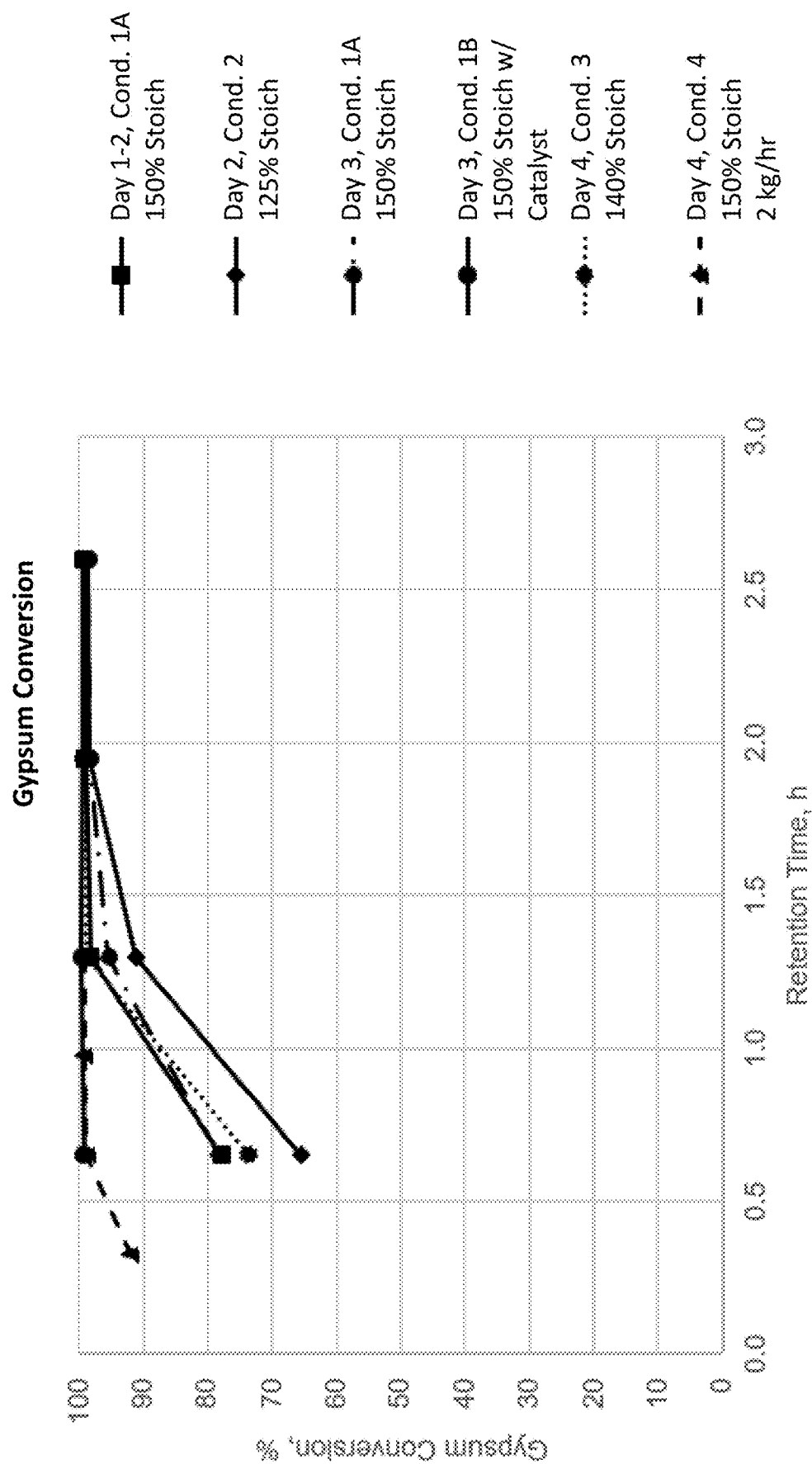
FIG. 9 depicts calculated gypsum conversion with changing conditions in the pilot production plant depicted in FIG. 8.

FIG. 9 depicts calculated gypsum conversion with changing conditions in pilot production plant 800 (FIG. 8). These tests showed that:

140%-150% stoichiometric addition of reagent with respect to the quantity of reactants was sufficient for quantitative conversion.
The catalyst addition reduced the reaction time.
Doubling the feed rates of FGD gypsum feedstock reduced the reaction time.

Figure 10:
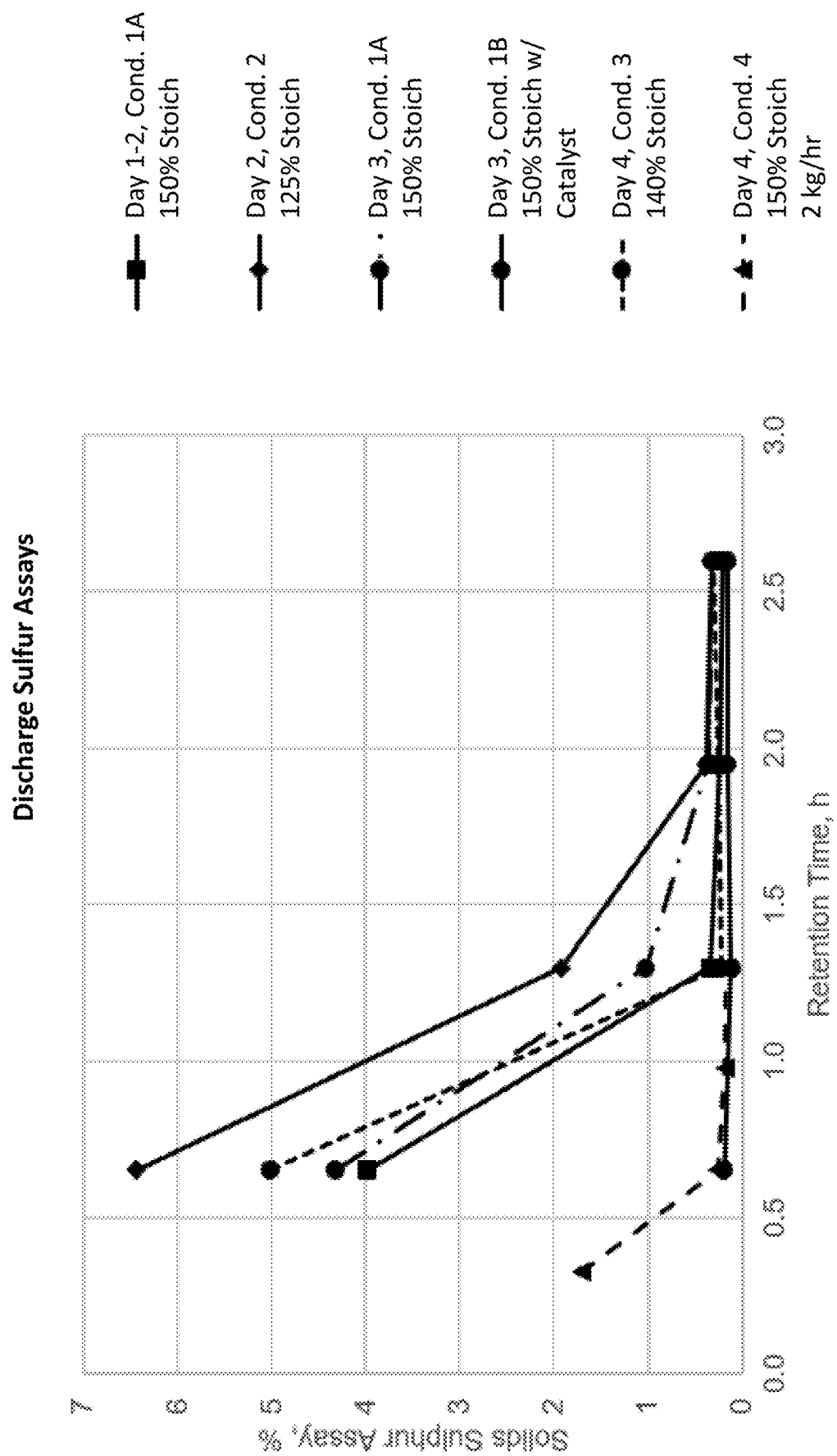
FIG. 10 depicts discharge sulfur assays from the pilot production plant depicted in FIG. 8.

FIG. 10 depicts discharge sulfur assays from the pilot production plant 800 (FIG. 8). Referencing FIG. 8, the majority of the conversion took place within the first two reactors 810, 811 (<1.5 hours for Conditions 1A and 3; and <0.75 hours for Conditions 1B and 4). The third and fourth reactors 812, 813 provided extra time to complete the reaction for the remaining gypsum.

Figure 11:
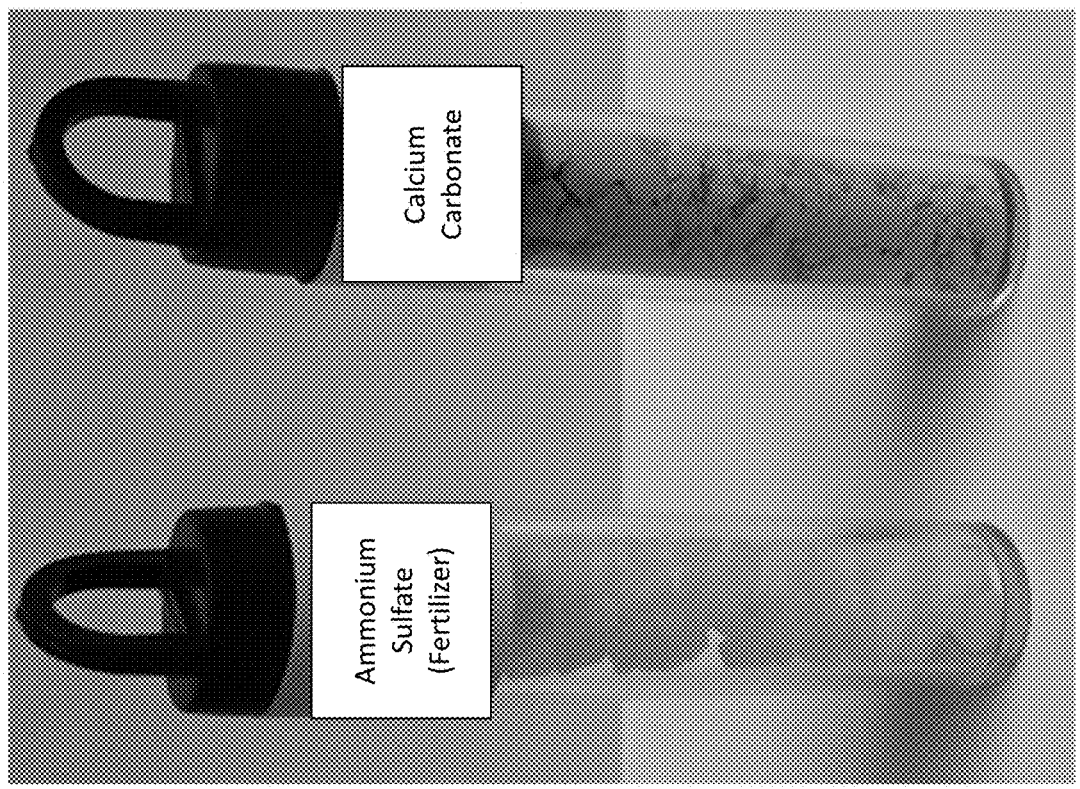
FIG. 11 depicts exemplary ammonium sulfate and calcium carbonate products produced by the pilot production plant depicted in FIG. 8.

The purity of the ammonium sulfate product produced in preliminary testing of the FGD conversion process was 99.9% (FIG. 7). The purity of the calcium carbonate produced in preliminary testing of the FGD conversion process was 93-95% (FIG. 7) with an average D50 particle size of 44 µm. While the calcium carbonate product was of good purity, the small amounts of impurities tinted the product a grey to tan color. The impurities causing the color were carbon and iron which are dependent on the impurities in the FGD gypsum feedstock. FIG. 11 depicts ammonium sulfate and calcium carbonate products generated by the pilot production plant 800 (FIG. 8). FIG. 12 depicts the composition of the ammonium sulfate crystal product produced in the pilot production plant 800 (FIG. 8). Variations in FGD gypsum feedstock may produce different results.

Variations in Feedstock

FGD Gypsum Feedstock Mixed with Ash

In some embodiments, where the FGD gypsum feedstock is mixed with coal ash, the FGD conversion process can produce a high purity ammonium sulfate and a second product that is comprised of calcium carbonate and ash. This product can be marketed as such, particularly to building material applications, or further processed in other separation schemes. The processing system and methods for FGD gypsum feedstock that is mixed with ash is the same as that depicted in FIG. 1; however, the calcium carbonate product may be lower purity than that generated from an FGD gypsum feedstock that is not mixed with ash. The amount of ash in FGD gypsum feedstock that is mixed with ash affects the purity of the calcium carbonate product when FGD gypsum feedstock mixed with ash is used in the FGD gypsum conversion process.

Removal of Chloride from Flue Gas Desulfurization Gypsum Feedstock

Some FGD gypsum feedstock contains levels of chloride that are too high for certain applications. The excess chloride is removed from FGD gypsum feedstock through a process of water leaching, in some embodiments. Water leaching may be carried out at any temperature between room temperature (20° C.) and boiling (100° C.).

An example chloride removal process used in testing is described below. The following process could be scaled according to processing requirements. Testing was carried out at 75° C. with two water leaches.

1) First add 1000 g of hot 75° C. deionized water in a reactor. Add 250 g of FGD gypsum feedstock sample. The mixture results in a slurry. Equip reactor with lid and impellor. The reactor and/or lid may be glass in some embodiments.
2) Agitate the slurry for half an hour.
3) After half hour slurry time, filter the leached FGD gypsum feedstock solids and collect the filtrate. Record filtration properties.
4) Add 1000 g of hot 75° C. water to the reactor along with the solids from step 3. Agitate for half an hour.
5) After the half hour agitation time, filter out the leached solids from step 4 and collect the filtrate, record filtration properties.
6) Combine 25 mL of filtrate 1 (step 3) with 25 mL of filtrate 2 (step 5) and submit for assay.
7) Dry the leached FGD gypsum feedstock at 95° C. or lower until the weight does not change.
8) Submit samples for assay by inductively coupled plasma-mass spectrometry (ICP-MS) and Chloride analysis.

The results obtained on an FGD gypsum feedstock sample that contained around 0.5% by weight chloride, showed that >99% of the chloride can be leached out in the chloride removal process. The concentration of chloride in the wash water was 1033 ppm. The cations associated with the chloride were calcium at 894 ppm and magnesium at 166 ppm. The chloride level in the washed FGD gypsum feedstock was reduced to around 100 ppm.

There are several techniques to remove impurities from the filtrate after the water leach before discharge including ion exchange columns, reverse osmosis, and other similar deionization techniques known in the art.

A test was run to determine where the chloride in FGD gypsum feedstock winds up when processed through the FGD gypsum conversion process. In the test, FGD gypsum feedstock containing 0.5% by weight chloride was processed by reacting with ammonium carbonate to convert the calcium sulfate to calcium carbonate and ammonium sulfate. That test showed that the $CaCO_3$ product had 16 ppm chloride and the ammonium sulfate had chloride at 434 ppm. The filtrate from the ammonium sulfate crystallization had 672 ppm chloride. On a weight percentage basis, the filtrate from the ammonium sulfate crystallization contains most of the chloride at 94.2%, the ammonium sulfate contained 5.2% and the calcium carbonate 0.6%. These results showed that water leaching to remove chlorides in the FGD gypsum feedstock prior to FGD conversion processing greatly enhances the qualities of the ammonium sulfate and calcium carbonate products by reducing the chloride impurity from 0.5% by weight to 100 ppm.

If the washed FGD gypsum feedstock was processed through the FGD gypsum conversion process depicted in FIG. 1, for example, negative impacts are not expected on the product quality due to chloride since 98% of the chlorides may be removed by washing.

Sulfite to Sulfate Conversion

Coal combustion products (CCP) are comprised of fly ash (fine particulates from the combustion process collected in filters), a lime or limestone absorption bed to clean out sulfur dioxide ($SO_2$) gases, and bottom ash remaining behind after coal combustion. The absorption bed is converted to calcium sulfate after absorption of SOx and oxidation of calcium sulfite to calcium sulfate. The calcium sulfate is the FGD gypsum feedstock.

Figure 13:
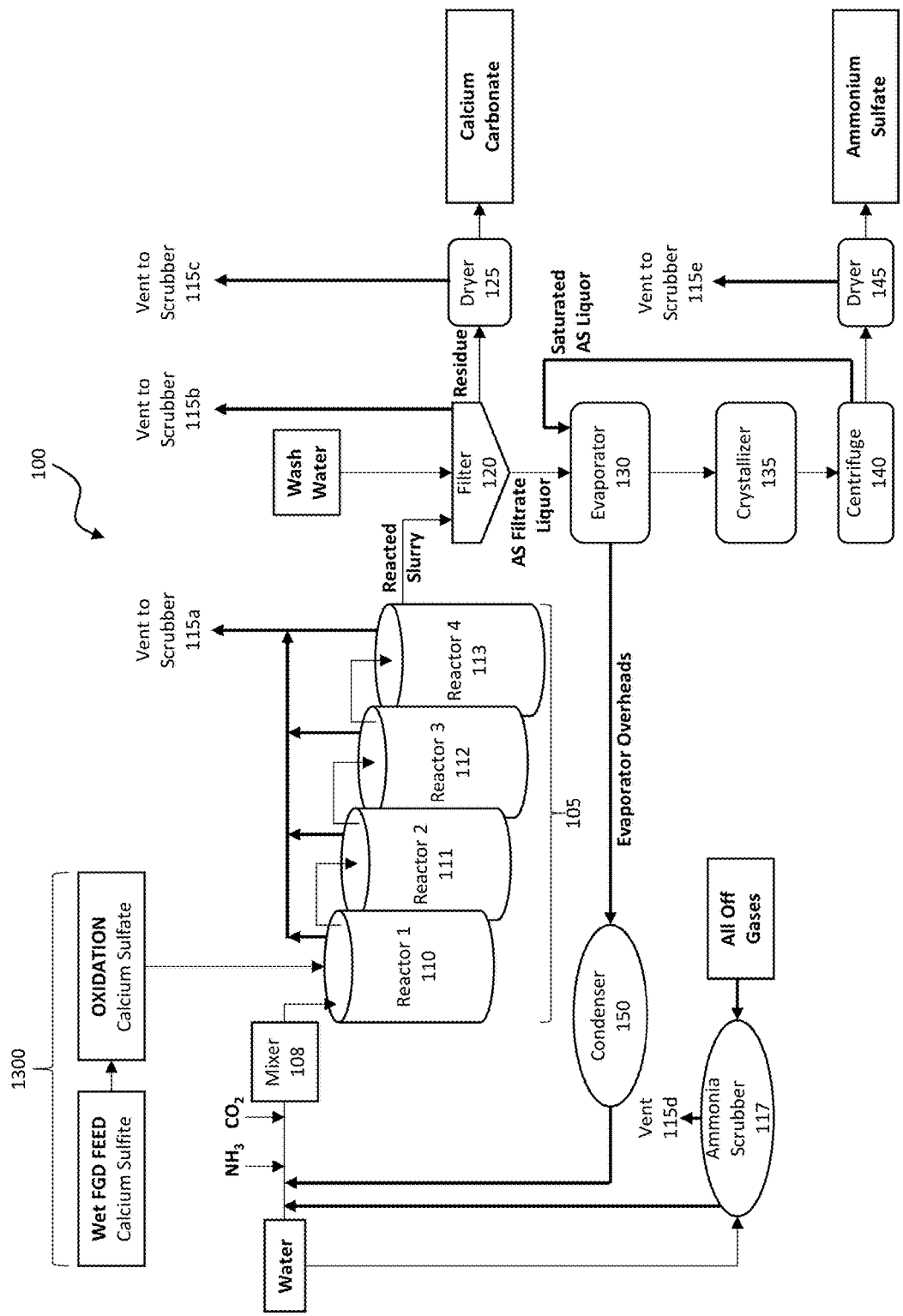
FIG. 13 depicts an embodiment of a calcium sulfite oxidation process added to FIG. 1 to treat the FGD gypsum feedstock prior to feeding into the FGD gypsum conversion process.

In some cases, the FGD gypsum feedstock may be in the form of a calcium sulfite slurry. In such embodiments, an oxidation step may be required to convert calcium sulfite to calcium sulfate. While there are several well-established methods to oxidize calcium sulfite to calcium sulfate, none have been coupled to a more comprehensive conversion process. The conversion of calcium sulfite to calcium sulfate (gypsum) is a well-developed technology, which is widely practiced and generally understood. There are a number of oxidation methods that may be coupled to the FGD conversion process depicted in FIG. 1. FIG. 13 depicts a modified production plant 100 (FIG. 1) with the addition of an oxidation step 1300 for calcium sulfite to calcium sulfate conversion prior to feeding into the FGD gypsum conversion process.

Forced Air Oxidation: There are conventional sparger oxidation bubble towers which are expensive to build, can be up to 60 feet in height, and require 200% excess air to achieve complete conversion of calcium sulfite to calcium sulfite. A newer and less expensive approach uses air turbine oxidizer systems. These could be sited remotely and greatly reduce the conventional air oxidation retrofit. This process is also accomplished in an acidic environment. The calcium sulfite is extremely soluble in an acid medium and the sulfite ion in solution oxidizes very quickly in an agitated solution to a sulfate ion. Once the calcium sulfate forms, it precipitates to a gypsum slurry very rapidly. Other approaches use mechanical agitation for froth flotation with added air oxidation.

Air Oxidation over Time: Calcium sulfite will eventually convert to calcium sulfate when exposed to air and in the presence of water or in a slurry. The reaction is very slow and does not meet normal process requirements. However, inventories that have been stored outdoors for a long period of time may have mostly converted to calcium sulfate and can be used directly in the FGD gypsum conversion processes described herein. The mere fact that calcium sulfite is recognized as a mineral suggests that the sulfite to sulfate conversion kinetics are extremely slow.

Oxidation with Oxygen: The oxidation of calcium sulfite to calcium sulfate can be accelerated by using oxygen in place of air. Oxygen concentrations as low as 5% by volume may be effective. In another embodiment, a low concentration of a metal ion is added as a catalyst to the reaction. An example would be 5 to 10 ppm ferric ion, manganese(II), or cobalt(II).

Hydrogen Peroxide Oxidation: Sulfur dioxide, and/or its aqueous byproduct sulfite, can be oxidized to sulfate with hydrogen peroxide. The reaction occurs over a wide pH range but is faster at lower pHs. This is conducted in an aqueous medium and involves the oxidation of dissolved sulfite ion with peroxide to convert to the more insoluble sulfate. Calcium peroxide may be used in place of hydrogen peroxide.

Products

Calcium Carbonate Processing

Acid Dissolution

In some embodiments, the calcium carbonate product produced by the FGD gypsum conversion process may comprise contaminants such as iron, carbon, and silicates. When such contaminants are present, the calcium carbonate may proceed through further processing to remove such contaminants resulting in a purer product. In some embodiments, such as the acid dissolution calcium whitening system and process 1400 depicted in FIG. 14, the calcium carbonate product may be dissolved in dissolver 1402 in dilute acid (such as hydrochloric acid (HCl), nitric acid (HNO$_3$), or another acid forming a soluble calcium salt). The basic reaction is shown in equation 2:

$$CaCO_3 \text{(insoluble)} + 2HCl \rightarrow CO_2 + Ca(Cl)_2 \text{ (soluble)} + H_2O \tag{2}$$

The carbon dioxide generated by equation 2 in dissolver 1402, in the depicted embodiment, may proceed to scrubber 1405 containing sodium hydroxide to form sodium carbonate.

The mixture resulting from equation 2 may then be filtered by filter 1410 with solid impurities proceeding to dryer 1415 and liquids proceeding to reactor 1420. The dried solids may comprise carbon and silicates, in some embodiments. If an iron contaminant is present in the calcium carbonate product produced by the FGD conversion process, hydrogen peroxide (H$_2$O$_2$) may be added to reactor 1420 to oxidize ferrous ion to ferric iron. An amount of base such as calcium hydroxide (in depicted embodiment), sodium hydroxide, and/or sodium carbonate may also be added to reactor 1420 to raise the pH in the reactor to 3 or higher to precipitate ferric hydroxide. The advantage of using calcium hydroxide is that the amount of high purity precipitated calcium carbonate produced is increased by the amount of calcium neutralizing agent used, thus improving process economics. The amount of base added is the amount that is necessary to reach the desired pH value. This reaction with sodium hydroxide is shown in equation 3, below:

$$Fe^{++} + H_2O_2 + NaOH \rightarrow Fe(III)(OH)_3 \text{ (insoluble)} + Na^+ \tag{3}$$

The slurry resulting from equation 3 in reactor 1420 may be filtered with filter 1425 to remove ferric hydroxide solids. In some embodiments, some carbon impurity may also filter out with the ferric hydroxide. In some embodiments, the ferric hydroxide is transferred to calciner 1430 resulting in a ferric oxide product. The filtrate from filter 1425 comprises a purified calcium chloride solution, or a mixed calcium and sodium chloride solution depending on the base used, which may then be combined with sodium carbonate, carbon dioxide, or another soluble carbonate, in reactor 1435 to produce precipitated calcium carbonate. The mixture may proceed through filter 1440 to separate solids and liquids. The solids may proceed through dryer 1445 to produce a white and high purity (>98%) precipitated calcium carbonate product. The precipitation reaction with sodium carbonate is shown in equation 4.

$$Ca(Cl)_2 + Na_2CO_3 \rightarrow 2NaCl + CaCO_3 \text{(insoluble)} \tag{4}$$

The filtrate from filter 1440 may proceed through dryer 1455 to produce sodium chloride.

In some embodiments wherein HCl was used in the acid dissolution calcium carbonate whitening process, the economics of this purification of calcium carbonate can be significantly improved if the resultant NaCl filtrate is regenerated back to NaOH and HCl using a chlor-alkali cell process.

Figure 14:
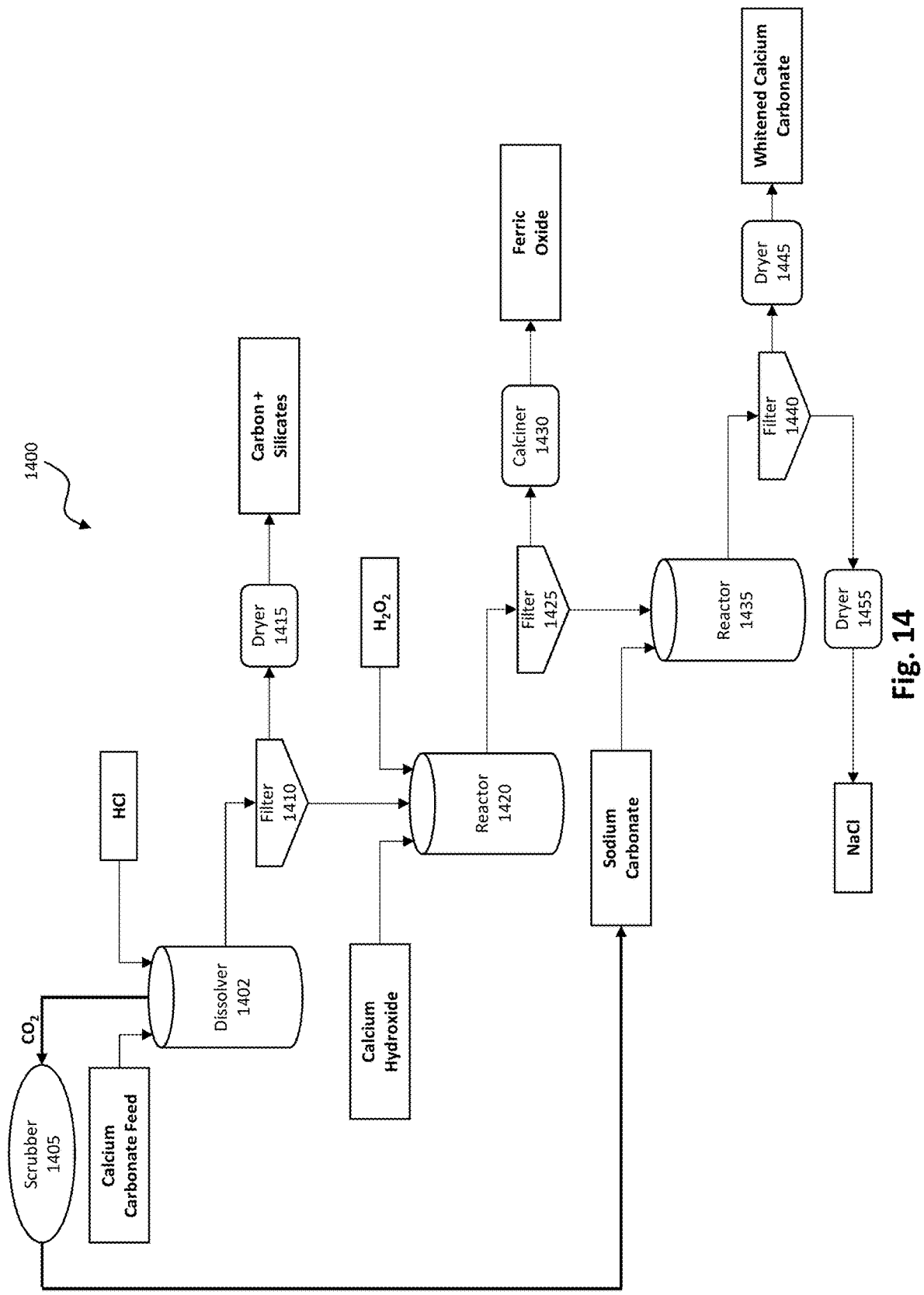
FIG. 14 depicts an embodiment of an acid dissolution calcium carbonate whitening process.
Figure 15:
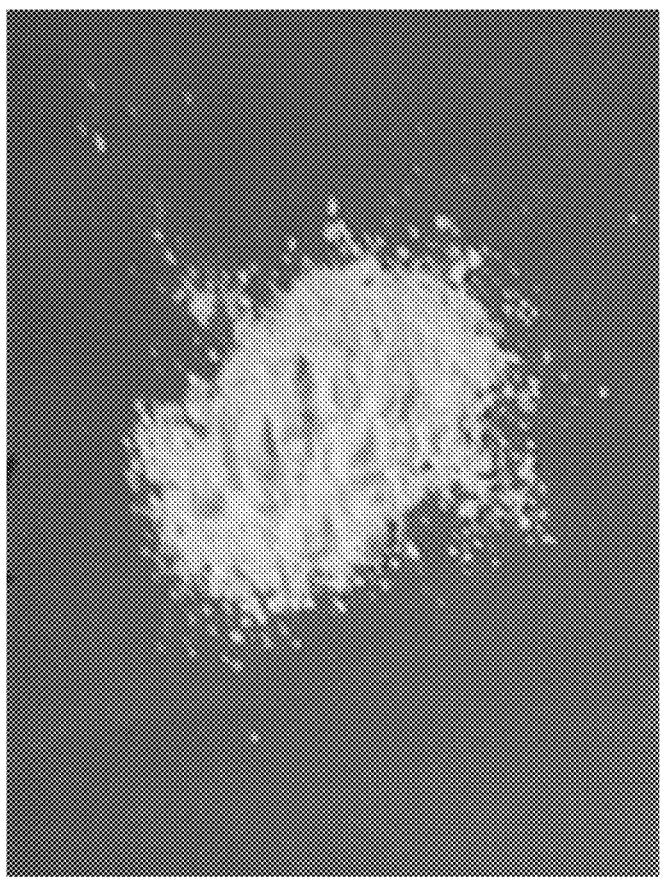
FIG. 15 depicts a whitened calcium carbonate product produced by the calcium carbonate whitening process depicted in FIG. 14.

FIG. 15 depicts a whitened calcium carbonate product generated by the calcium whitening process depicted in FIG. 14.

Catalyst

In some embodiments, a catalyst to delay the formation of calcium carbonate may be added to the reactor cascade 105 (FIG. 1) so that impurities (or impurities plus ash, in some embodiments) may be filtered out before the precipitate is formed. The addition of a catalyst results in a fine white and high purity (>98%) precipitated calcium carbonate product.

Figure 16:
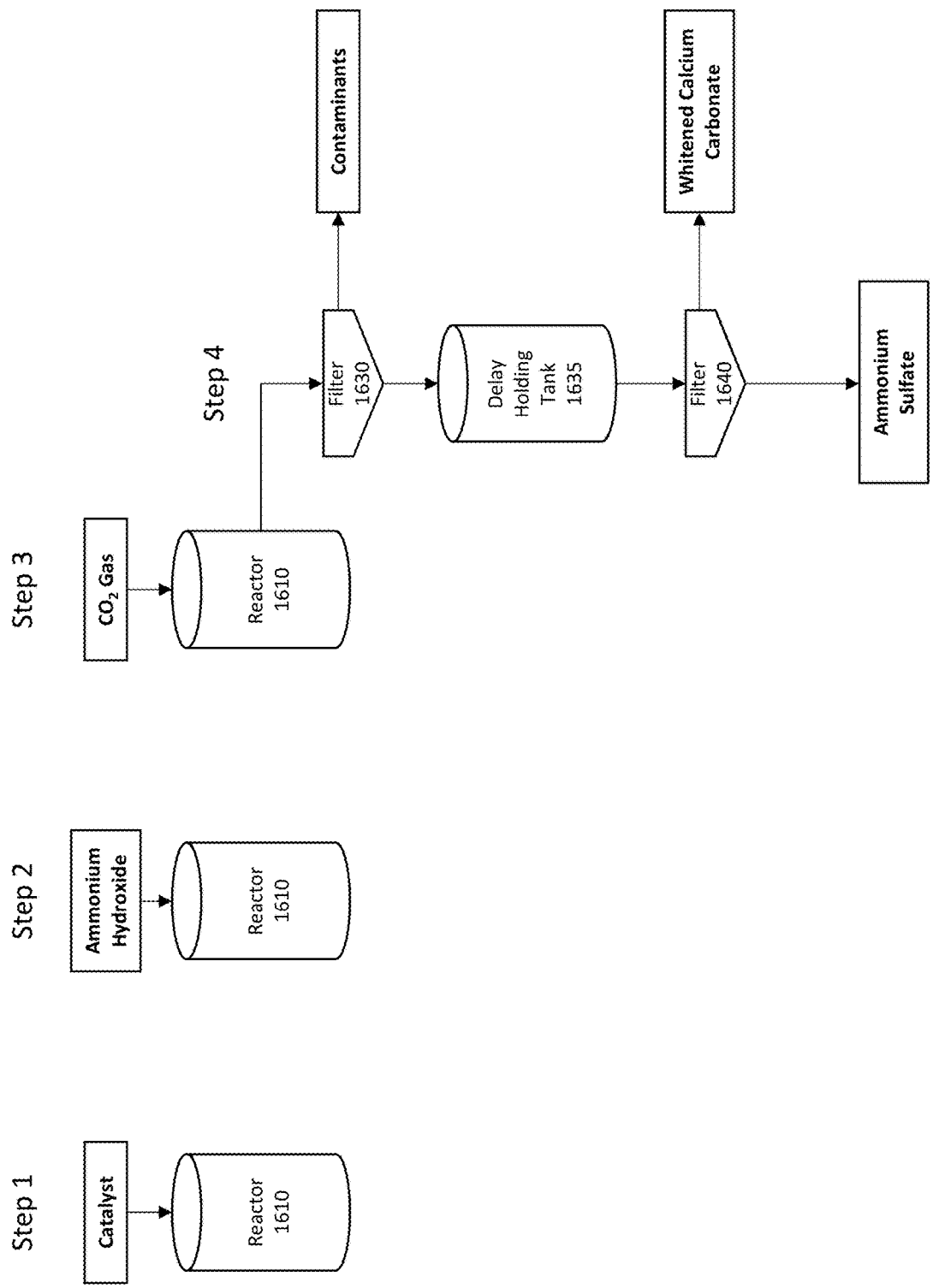
FIG. 16 depicts an example embodiment of a process for using a catalyst to separate impurities from calcium carbonate product produced by the FGD conversion process.

FGD gypsum feedstock may comprise contaminants including carbon and/or fly ash, in some embodiments. An example embodiment of a process for using a catalyst to separate impurities from calcium carbonate is depicted in FIG. 16. In some embodiments, a quantity of a catalyst (0.5-7% by weight, in some embodiments) may be added to an FGD gypsum slurry mixture in a reactor 1610 wherein the FGD gypsum slurry mixture comprises a suspension in the range of 1% to 25% (4%, in some embodiments) weight by mass of FGD gypsum feedstock in water. The catalyst is allowed to mix, by means of a stirring mechanism in some embodiments, with the slurry for several minutes (5-30 minutes, in some embodiments). After mixing, an ammonium hydroxide solution may be added to the reactor vessel 1610 resulting in 1:1 ammonium hydroxide to slurry volumetric ratio. This addition of the ammonium hydroxide is immediately followed by the introduction of carbon dioxide gas at a rate of 4 L/minute±1 L/minute, in some embodiments. The concentration of the ammonium hydroxide solution is chosen to be a concentration that will stoichiometrically react with all of the sulfate in the FGD gypsum slurry to form ammonium sulfate according to equation 5:

$$2NH_4OH + CaSO_4 \cdot 2H_2O + CO_2 \rightarrow [NH_4]_2SO_4 + CaCO_3 + 3H_2O \tag{5}$$

The progress of the reaction can be followed by monitoring the pH which starts out at approximately 11.6 and with time drops to pH 7. At pH 7 all hydroxide has reacted and the solution is filtered (immediately, in some embodiments) through a 0.45 to 0.7 micron filter 1630. Filtration of the reacted FGD gypsum solution results in the separation of tramp fly ash and carbon from the resulting liquid comprising dissolved calcium carbonate and ammonium sulfate. The calcium carbonate in solution will separate from the ammonium sulfate solution in delay holding tank 1635 and can be collected by an additional filtration step 1640 using a 0.45 to 0.7 micron. In some embodiments, one or more of the filtration steps may be carried out using a filter composed of glass fibers.

The precipitation of calcium carbonate may be aided by seeding the solution with the desired crystalline form of calcium carbonate. In some embodiments, a small amount of product slurry may be recycled back to the reactor cascade 105 (FIG. 1). The seeds may be calcite. In some embodiments, the CaCO$_3$ precipitate may be so fine it is nano-sized. In some embodiments, the solution containing the CaCO$_3$ may be heated to cause the CaCO$_3$ precipitate to coagulate to improve filtration. This process also allows a wider range of feedstocks such as FGD gypsum feedstock mixed with ash. The solution passing filtration step 1640 contains the ammonium sulfate which can be harvested by various crystallization methods known in the art. In some embodiments, a catalyst is used to slow down the precipitation of calcium carbonate in order to allow the solution to be filtered. Some of the catalyst may remain in the ammonium sulfate solution and/or the crystallized product. The catalyst does not react with the reactants therefore it may be recaptured and/or recycled, in some embodiments.

In some embodiments, the filtered ammonium sulfate solution may be returned to the beginning of the process to make up the FGD gypsum feedstock slurry. In some embodiments, the appropriate concentration of catalyst may remain in the recycled solution such that no further addition of the catalyst is necessary. In some embodiments, makeup catalyst may be added to the solution as needed.

The calcium carbonate whitening process with catalyst can also be performed in the production plant embodiment shown in FIG. 1 with some modifications. For instance, referring to FIG. 1, the calcium carbonate whitening process with catalyst may plug in in the place of filter 120. Reacted slurry from the reactor cascade 105 would proceed into reactor 1610 (FIG. 16) through the process depicted in FIG. 16 with the liquor from filter 1640 (FIG. 16) proceeding to evaporator 130 and the whitened calcium carbonate optionally proceeding through dryer 125. In some embodiments, the catalyst may be added to the reactor cascade directly and the reacted slurry with catalyst may proceed from the reactor cascade 105 to filter 1630 (FIG. 16) (i.e. reactor cascade 105 from FIG. 1 replaces reactor 1610 in FIG. 16).

To facilitate the understanding of the embodiments described herein, a number of terms are defined below. The terms defined herein have meanings as commonly understood by a person of ordinary skill in the relevant art. Terms such as "a," "an," and "the" are not intended to refer to only a singular entity, but rather include the general class of which a specific example may be used for illustration. The terminology herein is used to describe specific embodiments, but their usage does not delimit the disclosure, except as set forth in the claims.

Batch Process: A batch process operates in separate discrete operations that are connected in a stepwise fashion with the materials processed being fed in batches.

Catalyst: A catalyst is an agent that can either accelerate or decelerate a chemical reaction without reacting with the reactants or products.

Continuous Process: A continuous process is designed to operate without interruptions. The materials being processed, either bulk dry or fluids, are continuously in motion undergoing chemical reactions or subject to mechanical or heat treatment.

Reducing the Cost of Reagents for Treating Metal Bearing Wastes

This disclosure relates generally to the hydrometallurgy field and more specifically to chemical treatment of Coal Combustion Products, and other industrial wastes, to produce value-added, marketable products while simultaneously minimizing or eliminating a resultant waste stream.

Coal combustion products (CCP) comprise of fly ash (fine particulates collected in filters), a lime or limestone absorption bed to clean out) $SO_x$ gases, and bottom ash remaining behind after coal combustion. The absorption bed is converted to calcium sulfate after absorption of $SO_x$ and oxidation of sulfite to sulfate. The latter is the flue gas desulfurization (FGD) gypsum. In some plants it is separate from the other products while in others it is mixed in with the ash. FGD gypsum has found applications in wallboard and soil amendment while fly ash has been used primarily in the building industry as a supplemental cementitious component of concrete. While some CCPs have found useful applications much of the coal ash remains at power plants in piles or ponds. These have presented environmental issues due to leaching of some toxic components into outfall and groundwater.

Many efforts have focused on tackling specific parts of CCPs such as efforts to convert calcium sulfate to ammonium sulfate fertilizer and calcium carbonate filler. Others have attempted to extracted specific elements out of the CCPs, such as rare earth elements, and discarded the remainder. To date there has not been a successful effort to treat the entire inventory and convert it to value-added, marketable products with practically no waste. That is the focus of this disclosure.

The present disclosure relates to systems and methods to first leach most elements from both C and F class coal ashes using a two-stage acid leach with different concentrations of hydrochloric acid and leaving a silica-rich residue behind as a product. A systematic and extensive evaluation of many acids and combinations of acids and salts led to effective leaching formulations.

The elements in the leachate are then separated by selective precipitation at different pHs using a base such as sodium hydroxide or calcium hydroxide. These are sequentially precipitated as hydroxides of iron, aluminum, misch metals (Rare Earth Elements or REEs and transition metals), magnesium, and calcium. The separations are quite clean and high purities (see tables) are obtained. The final liquor is clean sodium chloride or calcium chloride product, depending on the route taken, leaving nothing behind. The elements are separated as hydroxides, but they can be thermally converted to oxides or to carbonates by reactants such as sodium carbonate.

In some embodiments, the technical grade silica residue can be purified to >95% by fusion with solid sodium hydroxide or dissolving in an 8M NaOH solution. After filtration to remove the insolubles, the leachate is neutralized with an acid such as hydrochloric acid to precipitate silicic acid. After filtration, the silicic acid is converted to silica by heating in an oven at high temperature. The result is a high purity, higher value amorphous silica product with a surface area of >160 m^2·g. The insolubles from the first filtration are recycles back to the dissolvers and the filtrate from the second filtration is recycled to the precipitation step at the front of the process thereby ensuring practically no waste. The insolubles can be periodically purged and a valuable barium-rich product can be recovered.

This process can be applied to a number of other industrial waste products such as red mud from the aluminum process, slag from steel furnaces, and mine tailings among other metal bearing waste streams.

The present disclosure developed a series of hydrometallurgical processes that systematically separates the major elements from coal ash and eventually leaves behind practically no waste. A class F from Northern Appalachian coal and a class C ash from Powder River Basin Coal was used to ensure wide applicability. Class C ash contains higher calcium and lower silica while class F ash contains less calcium and more silica and is more difficult to acid leach. Their compositions are shown FIGS. 19-21. A thorough and systematic process was used to evaluate numerous acids, combination of acids, salt additives, and strong bases.

Figure 17:
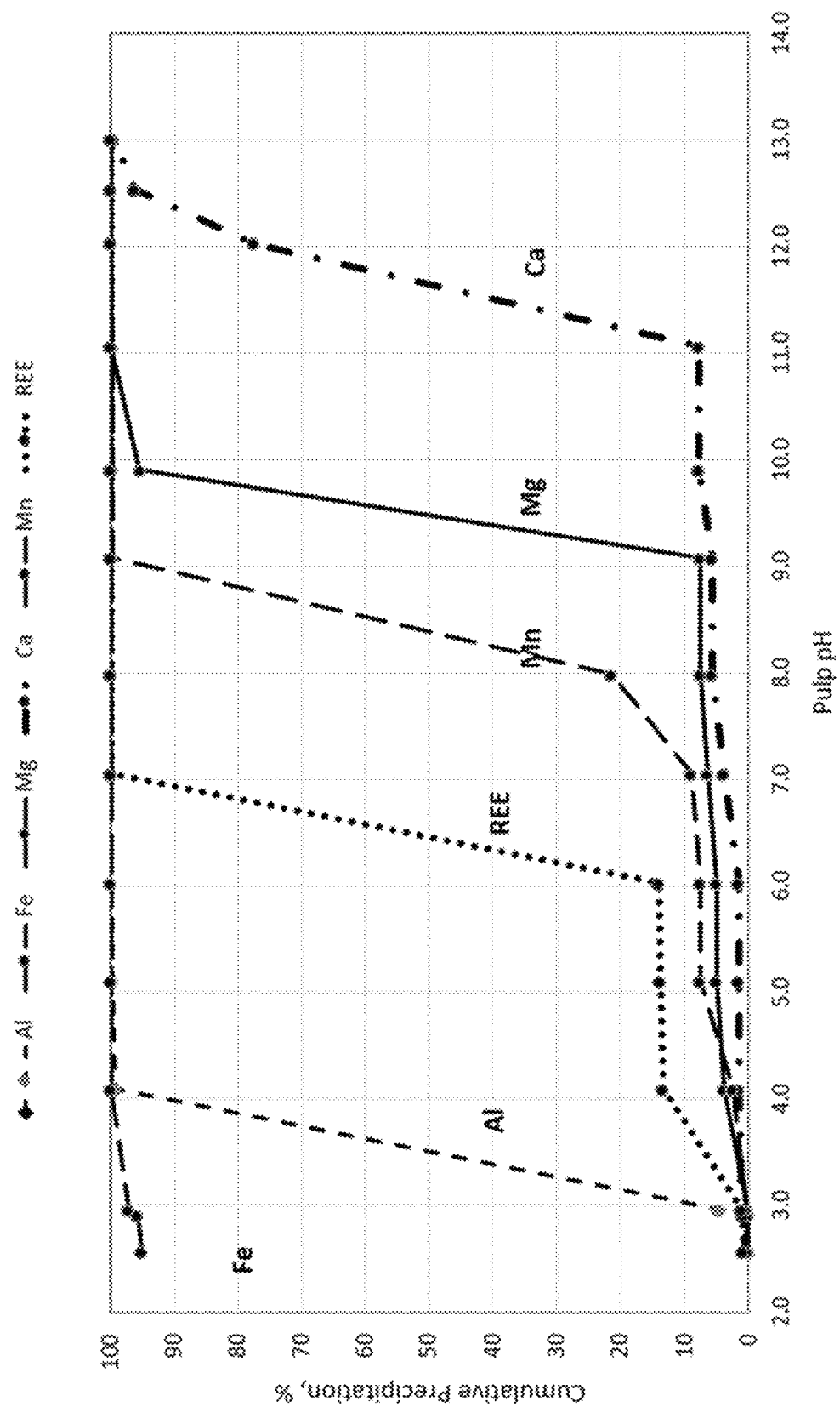
FIG. 17 is a chart depicting the excellent separation and cumulative elemental precipitation percent versus pulp pH for class C ash feedstock using caustic.
Figure 18:
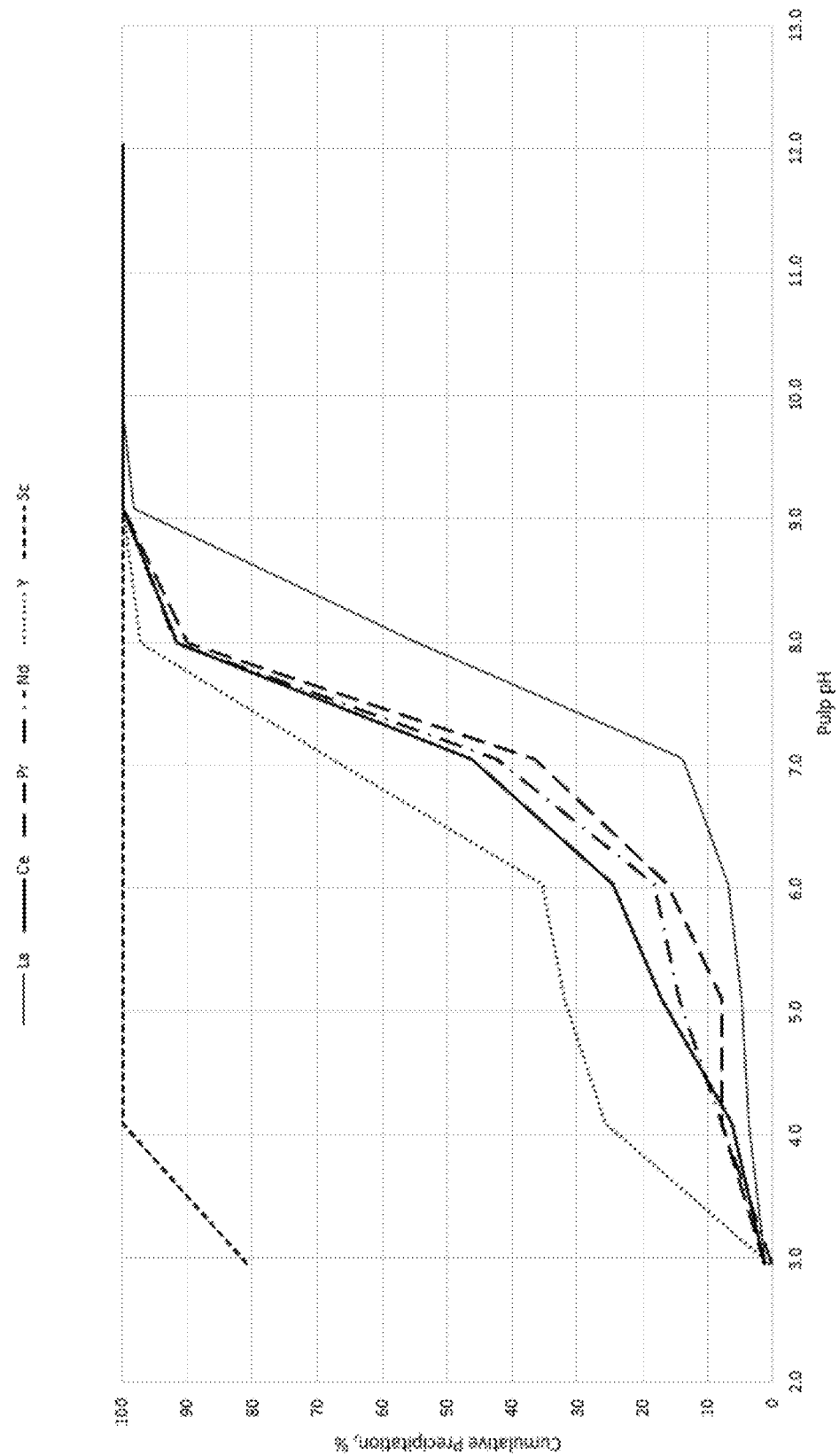
FIG. 18 is a chart depicting the cumulative precipitation of rare earth elements (REE versus pulp pH for class C ash feedstock using caustic with the bulk of the REEs precipitating between pH 4 and 8.

One adjustment that is made prior to the hydroxide precipitation is to add hydrogen peroxide to oxidize ferrous ion to ferric ion. As shown in FIG. 17 the sequence of precipitates is: Fe, Al, rare-earth elements (REEs) and transition metals, Mn, Mg, and Ca.

The following is simply an example of a precipitation test procedure. This disclosure is not limited to this procedure 1. Add required amount of feed solution (3000 ml) into a tared glass reaction kettle (all in a fume hood).
2. Prepare sufficient quantity of neutralizing reagent (NaOH or CaCO3/Ca(OH)2) concentrated and dilute.
3. Equip kettle with glass lid; agitate pulp with overhead mixer and Teflon impellor. pH, temperature, and ORP are probes required (pH and ORP probes are to be calibrated daily)
4. No heat input required. Slowly begin to add neutralizing base reagent. Use the more dilute reagent closer to the target pH. Time zero occurs when target pH is first achieved. Hold for one hour at target pH, with additional reagent additions as required.

Record all additions and temperature changes.

5. After required test time, record the net pulp weight, filter and collect filtrate, record filtration properties (time, color, paper type, etc.), determine weight, sg, pH and ORP.

6. Displacement water wash using 3×100 ml.

7. Collect the combined wash liquors, record filtration properties (time, color, paper type, etc.), determine weight, sg, pH, and ORP.

8. Dry solids at 95° C. or lower until constant mass.

9. Submit samples for assay as per requirements.

After each pH cut determining from initial scouting tests, the liquor is filtered to separate a product and the filtrate is then subjected to the next pH condition. The precipitates for iron and aluminum are difficult to filter with simple vacuum filtration but that is facilitated by high speed centrifugation. Iron is best separated at pH 2.5 to 3 to minimize the amount of aluminum, and aluminum is then precipitated at pH 4. The precipitation of some of the rare earths is shown in FIG. 7. As can be seen, scandium precipitates with iron while most of the other precipitate between pH 5 and pH 9. So, after pH 4 to separate aluminum, the next cut is at pH 8 or 9 for the REEs and some transition metals. Magnesium can be separated at pH 10 and calcium at pH 13. The final liquor is a clean sodium chloride solution containing traces of strontium and barium. It can be further purified by adding sodium carbonate and precipitating high value strontium and barium carbonates. At the end of this process a marketable sodium chloride solution remains that can be marketed as is or dried to the salt. It should be noted that barium as the sulfate is mostly insoluble in the leachant so most of it is in the residue where it can be recovered during silica purification.

The separated product hydroxides can be marketed as the hydroxides after drying or calcined to the oxides in an oven at various elevated temperatures or converted to carbonates by reaction with carbon dioxide or alkali carbonate. Iron hydroxide is usually fired to the reddish alpha-hematite pigment, aluminum hydroxide is spray dried and convert to different forms of alumina at different temperatures. The REEs and transition metals are best left as the hydroxide and marketed a misch metal to be further processed and separated. The hydroxide form is easier to process. The magnesium is converted to the oxide and the calcium to the carbonate. The calcium carbonate is very high purity and very white which increases its value.

Having described and illustrated the principles of the systems, methods, processes, and/or apparatuses disclosed herein in a preferred embodiment thereof, it should be apparent that the systems, methods, processes, and/or apparatuses may be modified in arrangement and detail without departing from such principles. Claim is made to all modifications and variation coming within the spirit and scope of the following claims.

What is claimed is:

1. A system, comprising:
a calcium sulfate feedstock comprising calcium sulfate and at least one metal component;
a mixer to mix an ammonia compound, carbon dioxide, and water resulting in a first reagent;
a first reactor to react the calcium sulfate feedstock with the first reagent to form a first reacted slurry comprising an ammonium sulfate liquor and a metal bearing calcium carbonate, wherein the metal bearing calcium carbonate comprises calcium carbonate and the at least one metal component;
a first filter to separate the metal bearing calcium carbonate from the ammonium sulfate liquor;
at least one of an evaporator, a crystallizer, a centrifuge, and a dryer to process the ammonium sulfate liquor to produce ammonium sulfate crystals;
a second reactor to dissolve the metal bearing calcium carbonate in a second reagent resulting in a second reacted slurry comprising a first solid and a first metal bearing processed liquor, wherein the first metal bearing processed liquor comprises the metal bearing calcium carbonate;
a second filter to separate the first solid from the first metal bearing processed liquor;
a third reactor to selectively precipitate the at least one metal component from the first metal bearing processed liquor resulting in a second metal bearing processed liquor, wherein the second metal bearing processed liquor comprises the calcium carbonate and the at least one metal component, wherein the selective precipitation is achieved by adding a first quantity of a base to the third reactor to elevate a pH of the first metal bearing processed liquor to a first predetermined pH level, wherein the first predetermined pH level causes the at least one metal component to precipitate;
a third filter to separate the at least one metal component from the second metal bearing processed liquor;
a fourth reactor to selectively precipitate a second metal component from the second metal bearing processed liquor, wherein the selective precipitation is achieved by adding a second quantity of the base to the fourth reactor to elevate a pH of the second metal bearing processed liquor to a second predetermined pH level, wherein the second predetermined pH level causes the second metal component to precipitate; and
a fourth filter to separate the second metal component from the second metal bearing processed liquor.

2. The system of claim 1 wherein the at least one metal component includes at least one of Iron, Copper, Aluminum, Strontium, and Uranium.

3. The system of claim 1 wherein the calcium sulfate feedstock further comprises at least one of red mud from aluminum processing, slag from a steel furnace, and mine tailings.

4. The system of claim 1 wherein the second reagent used for dissolution is an acid.

5. The system of claim 1 wherein the ammonia compound is at least one of ammonia gas, ammonium sulfate, and ammonium hydroxide.

6. The system of claim 1 wherein the base includes at least one of sodium hydroxide, calcium hydroxide, and sodium carbonate.

7. The system of claim 1, wherein the first predetermined pH level is 3, wherein at least one of Uranium, Thorium, and Scandium are precipitated.

8. The system of claim 1, wherein the at least one metal component in the metal component bearing calcium carbonate comprises at least one of Iron, Copper, Aluminum, Strontium, and Uranium.

9. A method, comprising:
mixing an ammonia compound, carbon dioxide, and water resulting in a first reagent;
reacting calcium sulfate feedstock with the first reagent in a first reactor to form a first reacted slurry comprising an ammonium sulfate liquor and a metal bearing calcium carbonate, wherein the calcium sulfate feedstock comprises calcium sulfate and at least one metal component and the metal bearing calcium carbonate comprises calcium carbonate and the at least one metal component;

separating the metal bearing calcium carbonate from the ammonium sulfate liquor with a first filter;

processing the ammonium sulfate liquor to produce ammonium sulfate crystals using at least one of an evaporator, a crystallizer, a centrifuge, and a dryer;

dissolving the metal bearing calcium carbonate in a second reagent in a second reactor to result in a second reacted slurry comprising a first solid and a first metal bearing processed liquor, wherein the first metal bearing processed liquor comprises the metal bearing calcium carbonate;

separating the first solid from the first metal bearing processed liquor with a second filter;

selectively precipitating the at least one metal component from the first metal bearing processed liquor in a third reactor by adding a first quantity of a base to elevate a pH of the first metal bearing processed liquor to a first predetermined pH level, resulting in a second metal bearing processed liquor, wherein the second metal bearing processed liquor comprises the calcium carbonate and the at least one metal component, wherein the first predetermined pH level causes the at least one metal component to precipitate;

separating the at least one metal component from the second metal bearing processed liquor using a third filter;

selectively precipitating a second metal component from the second metal bearing processed liquor in a fourth reactor by adding a second quantity of the base to elevate a pH of the second metal bearing processed liquor to a second predetermined pH level; and separating the second metal component from the second metal bearing processed liquor using a fourth filter.

10. The method of claim 9 wherein the at least one metal component in the calcium sulfate feedstock includes at least one of Iron, Copper, Aluminum, Strontium, and Uranium.

11. The method of claim 9 wherein the second reagent used for dissolution is an acid.

12. The method of claim 9 wherein the ammonia compound is at least one of ammonia gas, ammonium sulfate, and ammonium hydroxide.

13. The method of claim 9 wherein the calcium sulfate feedstock further comprises at least one of red mud from aluminum processing, slag from steel furnaces, and mine tailings.

14. The method of claim 9 wherein the base includes at least one of sodium hydroxide, calcium hydroxide, and sodium carbonate.

15. The method of claim 9 wherein the first predetermined pH level is 3, wherein at least one of Uranium, Thorium, and Scandium are precipitated.

16. The method of claim 9 wherein the at least one metal component in the metal bearing calcium carbonate comprises at least one of Iron, Copper, Aluminum, Strontium, and Uranium.

\* \* \* \* \*

(12) EX PARTE REEXAMINATION CERTIFICATE (12717th)
United States Patent
Papouchado et al.

(10) Number: US 11,148,956 C1
(45) Certificate Issued: Sep. 25, 2024

(54) SYSTEMS AND METHODS TO TREAT FLUE GAS DESULFURIZATION WASTE TO PRODUCE AMMONIUM SULFATE AND CALCIUM CARBONATE PRODUCTS

(71) Applicant: Elixsys Inc., Bainbridge Island, WA (US)

(72) Inventors: Lucien Papouchado, Aiken, SC (US); Barry E. Scheetz, Lemont, PA (US); Joseph Preston, Bainbridge Island, WA (US)

(73) Assignee: DAVY POWERSPORTS INC., Bainbridge Island, WA (US)

Reexamination Request:
No. 90/019,383, Jan. 18, 2024

Reexamination Certificate for:
Patent No.: 11,148,956
Issued: Oct. 19, 2021
Appl. No.: 16/749,860
Filed: Jan. 22, 2020

Related U.S. Application Data

(60) Provisional application No. 62/796,541, filed on Jan. 24, 2019, provisional application No. 62/810,066, filed on Feb. 25, 2019, provisional application No. 62/824,523, filed on Mar. 27, 2019, provisional application No. 62/878,542, filed on Jul. 25, 2019.

(51) Int. Cl.
*C01C 1/244* (2006.01)
*C01F 11/18* (2006.01)

(52) U.S. Cl.
CPC ............ *C01C 1/244* (2013.01); *C01F 11/182* (2013.01); *C01P 2004/50* (2013.01); *C01P 2006/80* (2013.01)

(58) Field of Classification Search
None
See application file for complete search history.

(56) References Cited

To view the complete listing of prior art documents cited during the proceeding for Reexamination Control Number 90/019,383, please refer to the USPTO's Patent Electronic System.

*Primary Examiner* — Elizabeth L McKane

(57) ABSTRACT

Disclosed herein are system and methods for producing a high purity ammonium sulfate product as well as either a lower or a high purity calcium carbonate product by reacting flue gas desulfurization (FGD) gypsum feedstock in batch or continuous mode using synthesized ammonium carbonate from ammonia and carbon dioxide gases. The high purity calcium carbonate is obtained by using a precipitation catalyst, filtering out the impurities, then precipitating a high purity calcium carbonate. Alternatively, the lower purity calcium carbonate may be dissolved in acid, impurities filtered out, then a high purity calcium carbonate is precipitated out using a soluble carbonate salt.

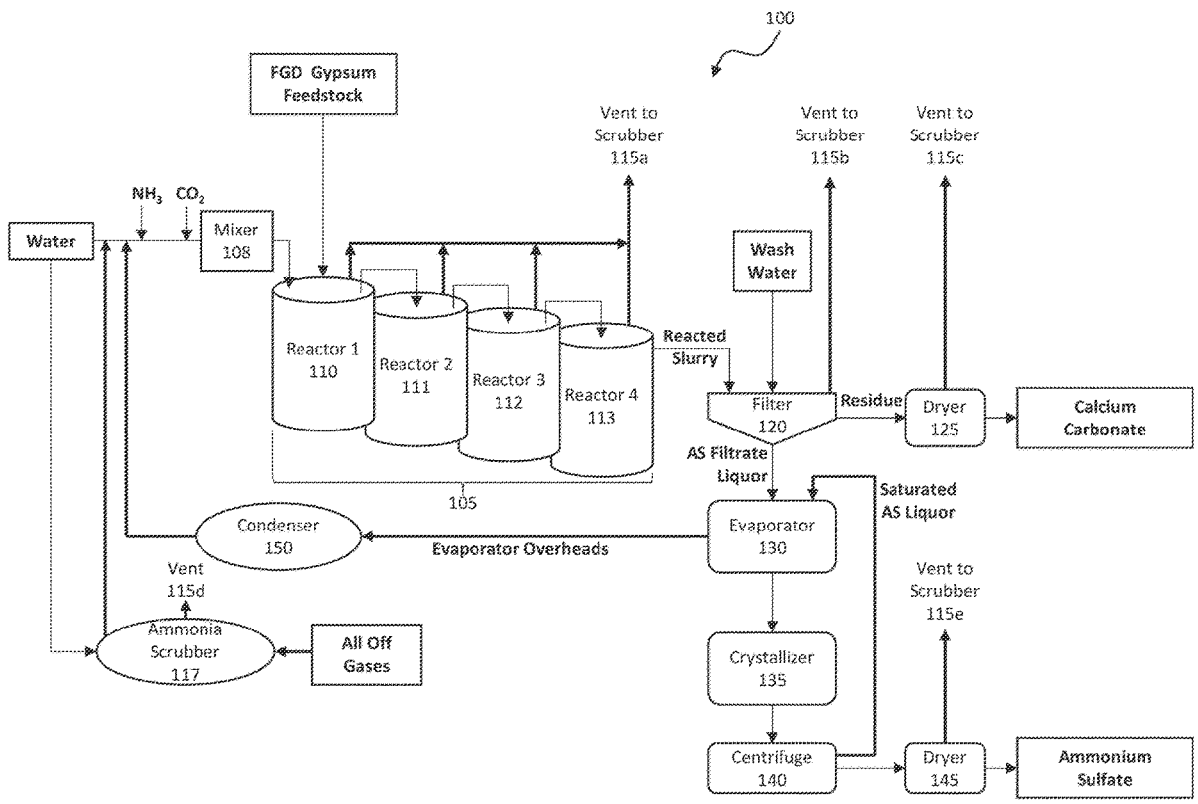

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-9 are cancelled.

Claims 10-16 are determined to be patentable as amended.

10. The method of claim [9] *15* wherein the at least one metal component in the calcium sulfate feedstock [includes] *further comprises* at least one of Iron, Copper, Aluminum, *and* Strontium[, and Uranium].

11. The method of claim [9] *15* wherein the second reagent used for dissolution is an acid.

12. The method of claim [9] *15* wherein the ammonia compound is at least one of ammonia gas, ammonium sulfate, and ammonium hydroxide.

13. The method of claim [9] *15* wherein the calcium sulfate feedstock further comprises at least one of red mud from aluminum processing, slag from steel furnaces, and mine tailings.

14. The method of claim [9] *15* wherein the base includes at least one of sodium hydroxide, calcium hydroxide, and sodium carbonate.

15. [The method of claim 9] *A method, comprising:*

*mixing an ammonia compound, carbon dioxide, and water resulting in a first reagent;*

*reacting calcium sulfate feedstock with the first reagent in a first reactor to form a first reacted slurry comprising an ammonium sulfate liquor and a metal bearing calcium carbonate, wherein the calcium sulfate feedstock comprises calcium sulfate and at least one metal component and the metal bearing calcium carbonate comprises calcium carbonate and the at least one metal component;*

*separating the metal bearing calcium carbonate from the ammonium sulfate liquor with a first filter;*

*processing the ammonium sulfate liquor to produce ammonium sulfate crystals using at least one of an evaporator, a crystallizer, a centrifuge, and a dryer;*

*dissolving the metal bearing calcium carbonate in a second reagent in a second reactor to result in a second reacted slurry comprising a first solid and a first metal bearing processed liquor, wherein the first metal bearing processed liquor comprises the metal bearing calcium carbonate;*

*separating the first solid from the first metal bearing processed liquor with a second filter;*

*selectively precipitating the at least one metal component from the first metal bearing processed liquor in a third reactor by adding a first quantity of a base to elevate a pH of the first metal bearing processed liquor to a first predetermined pH level, resulting in a second metal bearing processed liquor, wherein the second metal bearing processed liquor comprises the calcium carbonate and the at least one metal component, wherein the first predetermined pH level is 3, wherein at least one of Uranium, Thorium, and Scandium are precipitated;*

*separating the at least one metal component from the second metal bearing processed liquor using a third filter;*

*selectively precipitating a second metal component from the second metal bearing processed liquor in a fourth reactor by adding a second quantity of the base to elevate a pH of the second metal bearing processed liquor to a second predetermined pH level; and*

*separating the second metal component from the second metal bearing processed liquor using a fourth filter.*

16. The method of claim [9] *15* wherein the at least one metal component in the metal bearing calcium carbonate *further* comprises at least one of Iron, Copper, Aluminum, *and* Strontium[, and Uranium].

* * * * *